(12) United States Patent
Chang

(10) Patent No.: US 11,595,232 B1
(45) Date of Patent: Feb. 28, 2023

(54) SWITCH FABRIC FOR A DATA CENTER NETWORK HAVING VIRTUAL MACHINES

(71) Applicant: Paul Chang, Fullerton, CA (US)

(72) Inventor: Paul Chang, Fullerton, CA (US)

( * ) Notice: Subject to any disclaimer, the term of this patent is extended or adjusted under 35 U.S.C. 154(b) by 0 days.

(21) Appl. No.: 17/373,774

(22) Filed: Jul. 13, 2021

(51) Int. Cl.
*H04L 12/46* (2006.01)

(52) U.S. Cl.
CPC ...... *H04L 12/4675* (2013.01); *H04L 12/4633* (2013.01); *H04L 12/4645* (2013.01)

(58) Field of Classification Search
CPC ............. H04L 12/4675; H04L 12/4645; H04L 12/4633
See application file for complete search history.

(56) References Cited

U.S. PATENT DOCUMENTS

| | | | |
|---|---|---|---|
| 11,070,471 B1* | 7/2021 | Chang | H04L 45/66 |
| 11,368,484 B1* | 6/2022 | Sharma | H04L 63/1483 |
| 2010/0097934 A1* | 4/2010 | Hendel | H04L 45/04 |
| | | | 370/392 |
| 2014/0092901 A1* | 4/2014 | Kapadia | H04L 49/3009 |
| | | | 370/392 |
| 2014/0101336 A1* | 4/2014 | Yang | H04L 45/02 |
| | | | 709/244 |
| 2014/0254590 A1* | 9/2014 | Yang | H04L 12/1886 |
| | | | 370/390 |
| 2015/0124590 A1* | 5/2015 | Chu | H04L 49/70 |
| | | | 370/225 |
| 2016/0021032 A1* | 1/2016 | Maier | H04L 49/70 |
| | | | 370/401 |
| 2016/0261496 A1* | 9/2016 | Chang | H04L 12/4633 |
| 2017/0222909 A1* | 8/2017 | Sadana | H04L 45/04 |
| 2017/0346721 A1* | 11/2017 | Bacthu | H04L 45/16 |
| 2018/0176145 A1* | 6/2018 | Sharma | H04L 47/25 |
| 2019/0132322 A1* | 5/2019 | Song | H04L 63/101 |

* cited by examiner

*Primary Examiner* — Mohamed A. Wasel
(74) *Attorney, Agent, or Firm* — File-EE-Patents.com; Jay A. Chesavage

(57) ABSTRACT

A fabric for container virtual machines (CM) has cross fabric spine switches coupled to spine switches, each spine switch coupled to has a leaf switches, each leaf switch coupled to servers hosting CVM processes. Each of the leaf switches has an uplink port coupled to a spine switch leaf port configured in a mesh. The spine switches have a plurality of uplink ports for coupling to a plurality of cross fabric spine (CFS) ports into a mesh. The cross fabric spine switches keep a CF-NHCIB table of entries containing capabilities, and also a CF-FIB slice table which maintains entries for assignment of CVMs to new spine switches, such as GTID range, MAC Range, IP range associated with a spine port and spine address (MAC and/or IP) for transferring packets through the fabric.

18 Claims, 18 Drawing Sheets

Prior Art Virtual Machine Routing

Leaf Switch Process
300

Figure 3B
Leaf Tenant ID (LTID) tables

340 | {port,VLAN_ID}->GTID
342 | {port,GTID}->VLAN_ID

Figure 3C
Leaf FIB (LFIB) table

352 | {GTID,MAC_addr}->DL_leaf_port
354 | {GTID,IP_addr}->{DL_leaf_port,new_MAC_addr}

Spine Switch Process
400

Spine GFIB table slice
442
444

Leaf Switch Uplink
and Downlink Process
500

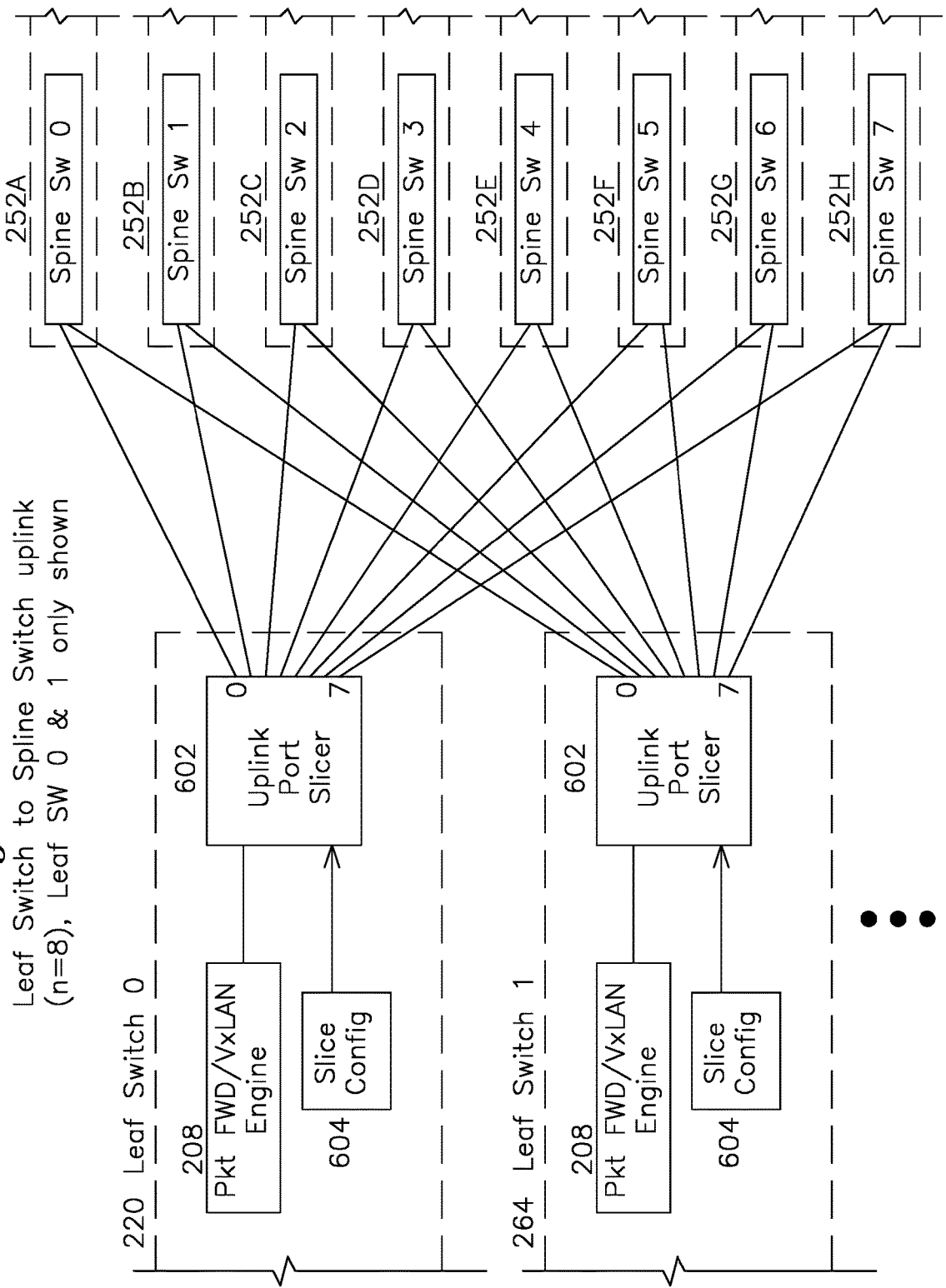

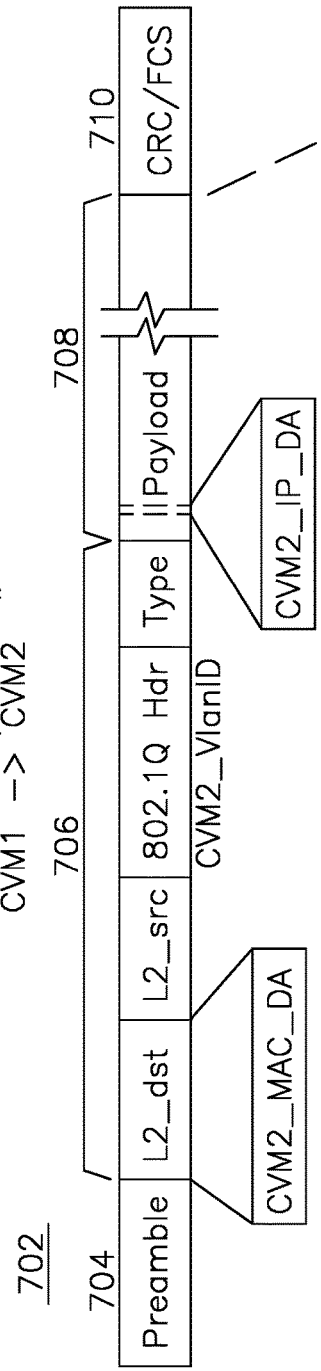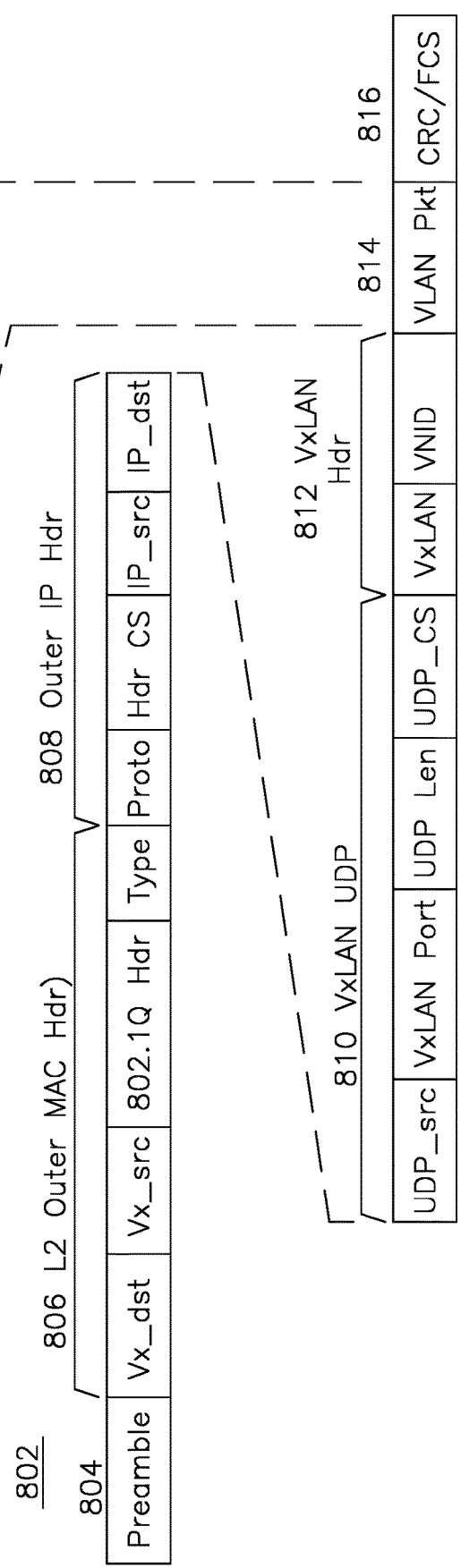

CVM1 -> CVM2 Switch Path using Layer 2 MAC Address

CVM1 -> CVM2 Switch Path using Layer 3

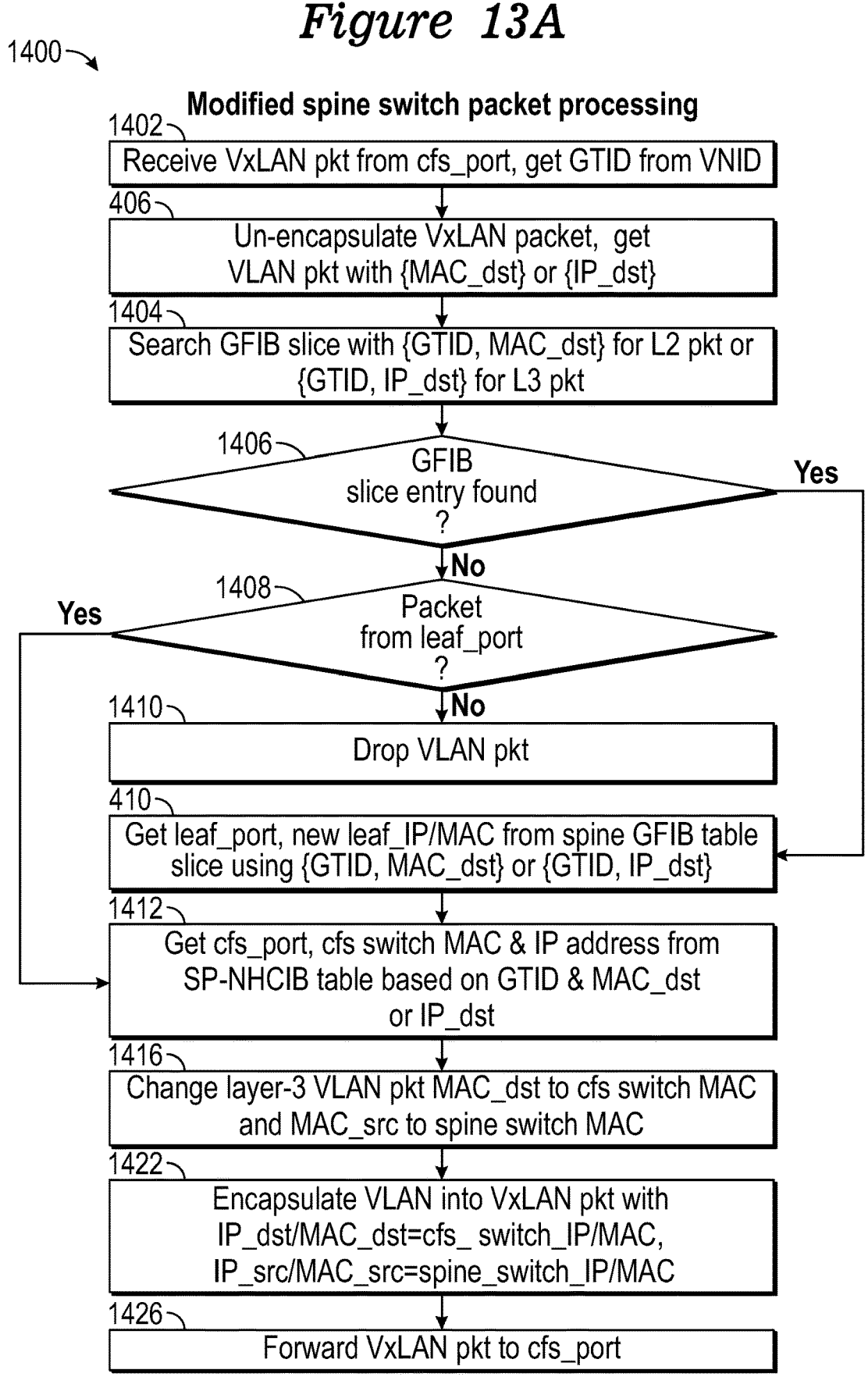

SP-NHCIB Table

1462 — {GTID,MAC,IP}->cfs_port, cfs_MAC, cfs_IP

Figure 15A
**CVM1 Thru Spine Switch 1 in Fabric 1 -> CFS 1 -> CVM2
Thru Spine Switch 2 in Fabric 2 using Layer 2 MAC Address**
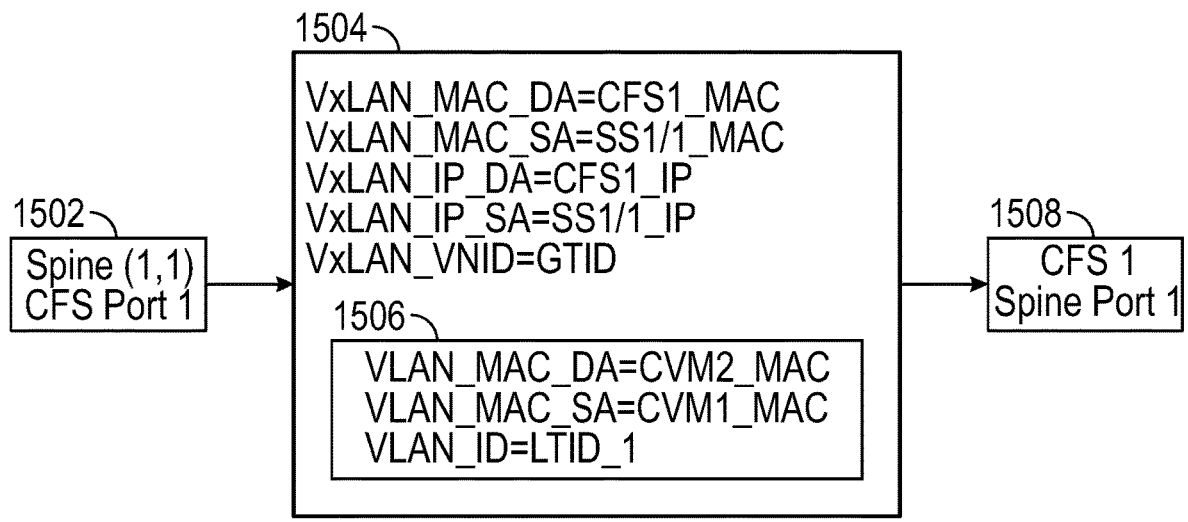
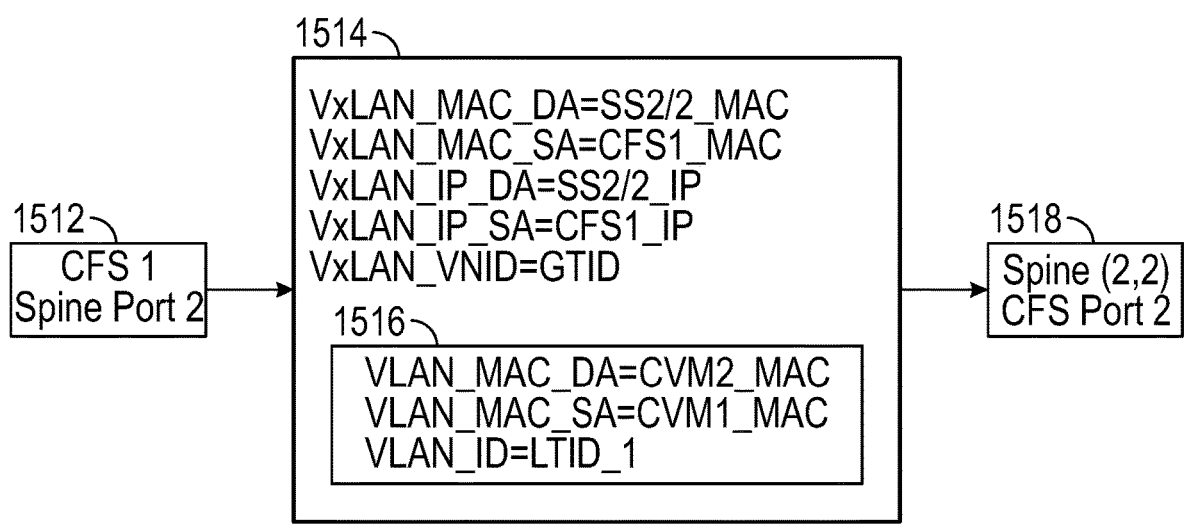

SWITCH FABRIC FOR A DATA CENTER NETWORK HAVING VIRTUAL MACHINES

FIELD OF THE INVENTION

The present invention relates to a network switch and associated control plane software for use in controlling network traffic among a plurality of high speed, densely populated data center switch fabric, each switch fabric being interconnected comprising a plurality of leaf switches and a plurality of spine switches.

BACKGROUND OF THE INVENTION

As virtual machine networks such as Amazon Web Services (AWS) and Microsoft Azure web services grow, the growing number of virtual machines places a strain on the web infrastructure which supports the virtual machines (known as container/virtual machines, or CVMs). Each CVM is assigned a Global Tenant ID (GTID) associated with the MAC or IP address of the CVM.

Each of the CVMs may be associated with a particular switch fabric, which may be considered to be a plurality of leaf switches coupled to a spine switch which provides connectivity between the leaf switches. When the number of CVMs increases a scaling problem results where it becomes necessary to tie the various switch fabrics together at the spine switch level. One of the problems of managing and maintaining a huge number of CVMs across multiple switch fabrics is that when CVMs are created in one switch fabric, they may subsequently be moved from an original switch fabric to a different switch fabric later on for reasons such as minimizing packet latency, optimizing resource utilization, etc. Present switch fabric architectures are unable to handle such re-assignment.

It is desired to provide a switch fabric, switch architecture, and control software to provide leaf switches with downlink ports for connection to servers, the leaf switches having an uplink port for coupling to a plurality of spine switches, and a plurality of cross fabric spine switches for coupling to the spine switch uplink ports.

OBJECTS OF THE INVENTION

A first object of the invention is a switch fabric for Container/Virtual Machines (CVM) where one or more spine switches are coupled to a plurality of leaf switches through leaf switch uplink ports, each leaf switch maintaining a Leaf Forwarding Information Base (LFIB) with an association between GTID, MAC Address, IP address, coupled to a plurality of hosts through leaf switch downlink ports, where a request from a CVM in a host is directed to the leaf switch, then if the destination CVM in the request has a matching entry in the leaf switch LFIB, to another downlink port, otherwise to a spine switch, in which the request will be forward to the destination leaf switch if a matching entry with destination CVM can be found in the spine switch Global Forwarding Information Base (GFIB) table slice, otherwise to a cross fabric spine (CFS) switch if no matching entry can be found.

A second object of the invention is a plurality of cross fabric spine (CFS) switches having a plurality of spine ports, each of which is coupled to plurality of spine switches in different switch fabrics through the links between CFS switch spine ports and spine switch CFS ports, where VxLAN packets are directed from the spine switches in their sourcing fabrics to the spine switches in their destination fabrics, the CFS switch having a packet forwarder coupled to a Cross Fabric Forwarding Information Base (CF-FIB) table slice and Cross Fabric Next Hop Capability Information Base (CF-NHCIB) table, both tables associating GTID and CVM MAC or IP address to a CFS switch spine port, a spine switch MAC address and a spine switch IP address, the CFS switch packet forwarder un-encapsulating the VLAN packet from the VxLAN packet received from a spine switch in the sourcing fabric, identifying the CFS switch spine port, spine switch MAC and IP address from the CF-NHCIB or CF-FIB table slice using the GTID and IP or MAC address of destination CVM in the VLAN packet, thereafter modifying the layer-3 VLAN packet MAC addresses, re-encapsulating the CVM VLAN packet into a new VxLAN packet with the identified spine switch MAC and IP address as new VxLAN destination addresses and forwarding the new VxLAN packet to the identified spine port.

A third object of the invention is the spine switch's additions of a plurality of CFS ports, a SP-NHCIB (SPine Next Hop Capability Information Base) table and a packet forwarder, where packet forwarder receiving a VxLAN packet from one of its spine ports, retrieve GTID from VxLAN VNID, de-encapsulate VLAN packet from the VxLAN packet check for a matching GFIB table slice entry for the combination of GTID and VLAN destination CVM, and if a matching GFIB table slice entry cannot be found, will use the content inside the SP-NHCIB table to select the best capable CFS switch for handling network traffic to the GTID and/or the destination CVM in the VLAN packet, modify the layer-3 VLAN packet MAC address using the selected CFS switch MAC address, re-encapsulate the VLAN packet into a new VxLAN packet using the selected CFS switch MAC & IP addresses, and then send the new VxLAN packet to the CFS port connecting to the selected CFS switch, and where packet forwarder receiving a VxLAN packet from one of its CFS ports, retrieve GTID from VxLAN VNID, de-encapsulate VLAN packet from the VxLAN packet, check for a matching GFIB table slice entry for the combination of GTID and VLAN destination CVM, and if a matching GFIB table slice entry cannot be found, drop the VLAN packet or otherwise, identify the leaf port and leaf switch MAC/IP addresses from the matching entry, modify the layer-3 VLAN packet MAC address using the identified leaf switch MAC address, re-encapsulate the VLAN packet into a new VxLAN packet using the identified leaf switch MAC & IP addresses, and then send the new VxLAN packet to the identified leaf port.

A fourth object of the invention is the control plane software (CPS) running inside every leaf switch, spine switch and CFS switch in the data center, where the CPS in every switch during data center network initialization, establishes a reliable message connection such as TCP connection to each and every one its directly connected uplink switches for exchanging switch configuration, switch capability and CVM location information; Also, during data center network initialization the CPS in the leaf switch, broadcasts through its reliable message connections its configuration and capability data to all the CPS in its uplink spine switches, which in turns broadcast through their own reliable message connections their own configuration and capability data along with those received from the leaf switches to all the CPS of the CFS switches and thus enable the CPS in all the CFS switches to collect and compile each switch fabric's capability information into their own CF-NHCIB, while at the same time, the CPS in the CFS switches also sends their switch capability information to all the spine switches in the data center and thus enable the CPS in all spine switches to build up the content in their SP-NHCIB (SPine Next Hop Cross Fabric Switch); during data center network operation the CPS in the leaf switch upon detection of the birth of a new CVM or receiving a GARP packet from a moved CVM, sends out the CVM information through its reliable message connection to the CPS of one its uplink spine switches, which has best matching attributes with the CVM, and in the case of a moved CVM the CPS of a spine switch in turns based on the content of its SP-NHCIB sends out the information of the moved CVM through its reliable message connection to the CPS of one of its uplink CFS switches, which is best CFS switch capable of handling network traffic to the moved CVM, the CPS of a CFS switch upon receiving the information of a moved CVM from a spine switch sends a DEL-CVM message to the CPS of a spine switch in the moved CVM's original fabric, the CPS of the spine switch in turns delete the moved CVM from its GFIB table slice and then relay the DEL-CVM message to the moved CVM's original leaf switch, which in turns delete the CVM from its LFIB.

SUMMARY OF THE INVENTION

A cross-spine switch fabric of the present invention comprises:

a plurality of leaf switches with downlink ports for coupling to servers hosting CVM processes, each leaf switch having a Local Tenant IDentifier (LTID) table indicating a list of local tenants identified by Global Tenant IDentifier (GTID), downlink port, and VLAN_ID, and also a Leaf Forwarding Base (LFIB) table containing associations between GTID, address, and leaf switch downlink port for an associated container virtual machine (CVM);

each of the plurality of leaf switches having an uplink port, each uplink port coupled to a plurality of spine switch leaf ports configured in a mesh;

the spine switches having a plurality of uplink ports for coupling to a plurality of cross fabric spine (CFS) ports into a mesh, each spine switch having a GFIB table slice containing entries indicating the relationship between a GTID and address to a leaf downlink port and address;

the cross fabric spine switches having downlink ports coupled to each of the spine switches in a mesh, each cross field spine switch keeping a CF-NHCIB table of entries containing spine switch capabilities, and also a CF-FIB table slice which maintains entries containing entries for assignment of CVMs to new spine switches, such as GTID range, MAC Range, IP range associated with a spine port and spine address (MAC and/or IP).

The leaf switches and spine switches are operative as described in FIGS. 2 through 9B.

In addition to the description of FIGS. 2 through 9B, the spine switches of the above referenced figures and associated specification are provided with uplink ports configured in a mesh such that each uplink port of a spine switch is coupled to a corresponding port of each of the cross fabric spine switches, each cross fabric spine switch having a cross-fabric next hop cross fabric switch (CF-NHCIB) table containing capability information for each spine switch coupled to it, and also a cross-fabric forwarding information base (CF-FIB) table which carries switch routing information to new CVM location for transitioning a CVM associated with one fabric to a different fabric. During a transition of a CVM from a fabric to a new fabric, an ADD_CVM message provides table information to the new leaf switch and associated spine switch, and a DEL_CVM message removes the old entry from the old leaf switch and associated spine switch. The CF-FIB will contain entries representing comprehensive routing information for all current CVMs in the fabric. Modifications to the CF-FIB, such as a CVM transitioning from one fabric to another, are handled by ADD_CVM and DEL_CVM messages to the respective joining and leaving fabrics.

In a cloud data center with a plurality of switch fabrics, a plurality of Cross Fabric Spine (CFS) switches are used to interconnect spine switches in different switch fabrics together. In this data center network, a plurality of CFS ports will be included into each spine switch and each of a plurality of CFS ports, say n, will be used to connect to one spine port in each of n CFS switches. Each CFS switch can be configured to possess different but mutually exclusive capability. For example, a set of CFS switches may be configured to be capable of serving network traffic for different class of tenants or different class of applications, etc. Furthermore, the combined capability of all the CFS switches together is capable of handling all possible network traffic that may appear in the data center network.

When a CVM is moved into a new switch fabric, it is highly desirable for the moved CVM to retain its original GTID, MAC and IP address in order for it to keep its existing connections with other CVMs intact. As a CVM is moved under a new leaf switch in a new fabric, a CVM update process will be started by having the moved CVM first sends out a Gratuitous ARP (GARP) packet to announce its presence in the new location. The GARP packet, in the VLAN packet format, will contain the moved CVM's original MAC and IP addresses along with its GTID expressed as a VLAN_ID. When the new leaf switch in the new fabric receives a GARP packet on one of its downlink ports, it will update its LFIB (Local Forwarding Information Base) with the moved CVM information and then send an ADD-CVM message to one of its spine switches based on the moved CVM attribute, which consists of a subset of bits from at least one of moved CVM's GTID, MAC address, or IP address as described for the leaf and spine switches of FIGS. 2 through 9B.

When a spine switch in the new fabric receives an ADD-CVM message from one of its leaf switches, it will also update its GFIB (Global Forwarding Information Base) table slice with the moved CVM's information and then forward the ADD-CVM message to one of the CFS switches, which is best capable of handling any network traffic to the moved CVM based on the matching between moved CVM attribute and the content stored in the spine switch NH_CFS (Next Hop Cross Fabric Switch) table, which contains the capability information of each CFS switch.

When a CFS switch receives an ADD-CVM message from one of the spine switches in one of the switch fabrics, it will first update its own CF-FIB (Cross Fabric Forwarding Information Base) table slice with the moved CVM's information and then send a DEL-CVM message to one of the spine switches in the moved CVM's original fabric, the spine switch selected is based on the mapping between moved CVM attribute and another CFS switch table called CF-NHCIB (Cross Fabric Next Hop Capability Information Base). This table defines the capability of each spine switch in the data center. For example, if the switch fabrics in a data center are configured to be based on different class of applications using different IP subnet address, then a CVM created in a switch fabric will carry an IP subnet address defined for that switch fabric. Another example, if the switch fabrics in a data center are configured to be based on different class of tenants with different ranges of GTID, then a CVM created in a switch fabric will carry a GTID which falls into the range defined for that switch fabric. This switch fabric capability information is therefore kept inside the CF-NHCIB of the CFS switch.

Subsequently when a spine switch in the original fabric receives a DEL-CVM delete message from a CFS switch, it will first relay the DEL-CVM message to the leaf switch specified by the moved CVM entry in its GFIB slice and then delete the moved CVM entry from its GFIB slice. Eventually when a leaf switch receives a DEL-CVM message, it will simply delete the moved CVM entry from its LFIB and that completes the CVM update process for the moved CVM.

In the data center when a CVM in one switch fabric wants to communicate with another CVM in another switch fabric in the data center, packets from the sourcing CVM will be forwarded from the sourcing fabric to the destination fabric through one of the CFS switches most capable to handling network traffic to the destination CVM. When a CFS switch receives a packet, it will first check if the destination CVM matches any entry in its CF-FIB table slice. If a matching entry is found, it will forward the packet to a spine switch in the destination fabric as specified in the matching CF-FIB table slice entry. Otherwise, it will check the content of its CF-NHCIB to decide which switch fabric should be the destination fabric and which spine switch in the destination fabric it should forward the packet to. After a spine switch in the destination fabric receives a packet from a CFS switch, it will follow the packet forwarding procedure established in the leaf and spine switch architecture of FIGS. 2 through 9B and forward the packet to its destination CVM.

A data center network with a plurality of switch fabrics for Container or Virtual Machine (CVM) communications has a plurality of cross fabric spine (CFS) switches, each CFS switch having a plurality of spine ports receiving and transmitting VxLAN packets to and from spine switches in different switch fabrics. The plurality of CFS switches may also have corresponding spine ports for handling of packets from spine switch CFS ports which have been subdivided by at least one of: MAC address bits, IP address bits, or Global Tenant Identified (GTID) bits. Each corresponding CFS switch spine port is coupled to a spine switch CFS port, each spine switch also having a plurality of leaf ports, each leaf port coupled to a leaf switch, each leaf switch also having a plurality of downlink ports, each downlink port coupled to a host server having a plurality of CVM processes as described in FIGS. 2 through 9B and associated specification.

During data center network initialization, the control plane software (CPS) in every leaf switch, spine switch and CFS switch inside the data center will first establish a reliable message connection to each and every one of its uplink switches, i.e., leaf switch to spine switch and spine switch to CFS switch. Each switch will then use its message connections to exchange switch configuration and switch capability information with its uplink switches. At the completion of data center network initialization, the CFS switches will have a complete picture of the capability in each and every spine switch in the data center and then store this information into its CF-NHCIB while the spine switches will have the capability information of each CFS switch in the data center and build up their SP-NHCIB tables.

During data center network operation, each CVM may be moved to another switch fabric after its creation but still may want to keep its GTID, MAC and IP address in order to continue its on-going communications with other CVMs intact. When a CVM is moved to a new leaf switch in the new fabric, it will initiate a CVM update process as follows: the moved CVM will send out a GARP packet to inform the new leaf switch in the new fabric about its arrival. The new leaf switch in the new fabric will then send out an ADD-CVM message to one of its uplink spine switches based on moved CVM attribute, i.e., move CVM MAC address, moved CVM IP address, moved CVM Tenant ID or a combination of three. Upon receiving an ADD-CVM message, the spine switch will update its GFIB slice and then relay the ADD-CVM message to one of the CFS switches best capable of handling network traffic to the moved CVM. Upon receiving an ADD-CVM message, the CFS switch will update its CF-FIB with the moved CVM and then send out a DEL-CVM message to one of its spine switches in the moved CVM original fabric based on the matching between moved CVM attribute and the content stored in its CF-NHCIB. Upon receiving a DEL-CVM message, the spine switch in the moved CVM original fabric will update its GFIB slice and then relay the DEL-CVM message to the moved CVM original leaf switch, which will in turn delete the moved CVM from its LFIB and that completes the CVM update process.

After the CVM update process is complete, packets from other CVMs to the moved CVM will still be able to be directed to the moved CVM new leaf switch in the new fabric as follows: When a leaf switch receives a VLAN packet with the destination CVM not found in its LFIB, it will encapsulate the VLAN packet into a VxLAN packet and send the VxLAN packet to one of its uplink spine switch based on destination CVM attribute. When a spine switch receives a VxLAN packet, it will get the GTID from the VxLAN VNID, de-encapsulate the VxLAN packet, retrieve the inner VLAN packet and then try to match the GTID and the VLAN packet destination CVM against its GFIB slice. Because the moved CVM has been deleted from the GFIB slice of the spine switch in the original fabric as the result of a previous CVM update process, the spine switch in the original fabric will not be able to find a matching GFIB slice entry and in this case, it will use its SP-NHCIB to select a CFS switch based on the combination of GTID and destination CVM attribute. After a CFS switch is selected, the spine switch will re-encapsulate the VLAN packet into a new VxLAN packet and send out the new VxLAN packet with destination set to the selected CFS switch. When a CFS switch receives a VxLAN packet, it will de-encapsulate the VxLAN packet, retrieve the inner VLAN packet and then try to match the VLAN packet destination CVM against its CF-FIB table slice. Because the moved CVM has been added into the CFS switch CF-FIB table slice as the result of a previous CVM update process, the CFS switch will now be able to find a matching CF-FIB table slice entry and then select a spine switch in the new fabric from the matching entry. After the spine switch in the new fabric is selected, the CFS switch will re-encapsulate the VLAN packet into a new VxLAN packet and then send out the new VxLAN packet with destination set to the selected spine switch in the new fabric, which will in turn de-encapsulate the VxLAN packet, find a matching entry in its GFIB slice and then re-encapsulate the VLAN packet into another VxLAN packet destined for the moved CVM new leaf switch based on the content stored in the matching GFIB slice entry from a previous CVM update process, the new leaf switch after receiving and de-encapsulating the VxLAN packet will find a matching entry in its LFIB because of a previous CVM update process and then send the VLAN packet with a new VLAN_ID as the destination CVM local tenant ID to one of its downlink port as specified by the matched entry.

BRIEF DESCRIPTION OF THE DRAWINGS

FIG. 3B shows the Local Tenant IDentifier (LTID) table.

FIG. 3C shows the Local Forward Information Base (LFIB) table.

FIG. 6 shows a block diagram detail view of the leaf switch to spine switch uplink port configuration.

FIG. 7 shows a diagram of a VLAN packet.

FIG. 8 shows a diagram of a VxLAN packet.

FIG. 13A shows a modified spine switch packet processing flowchart.

FIG. 15A shows layer 2 packet field modifications when packets moving between spine switches in two different switch fabrics through a CFS switch.

DETAILED DESCRIPTION OF THE INVENTION

Figure 1:
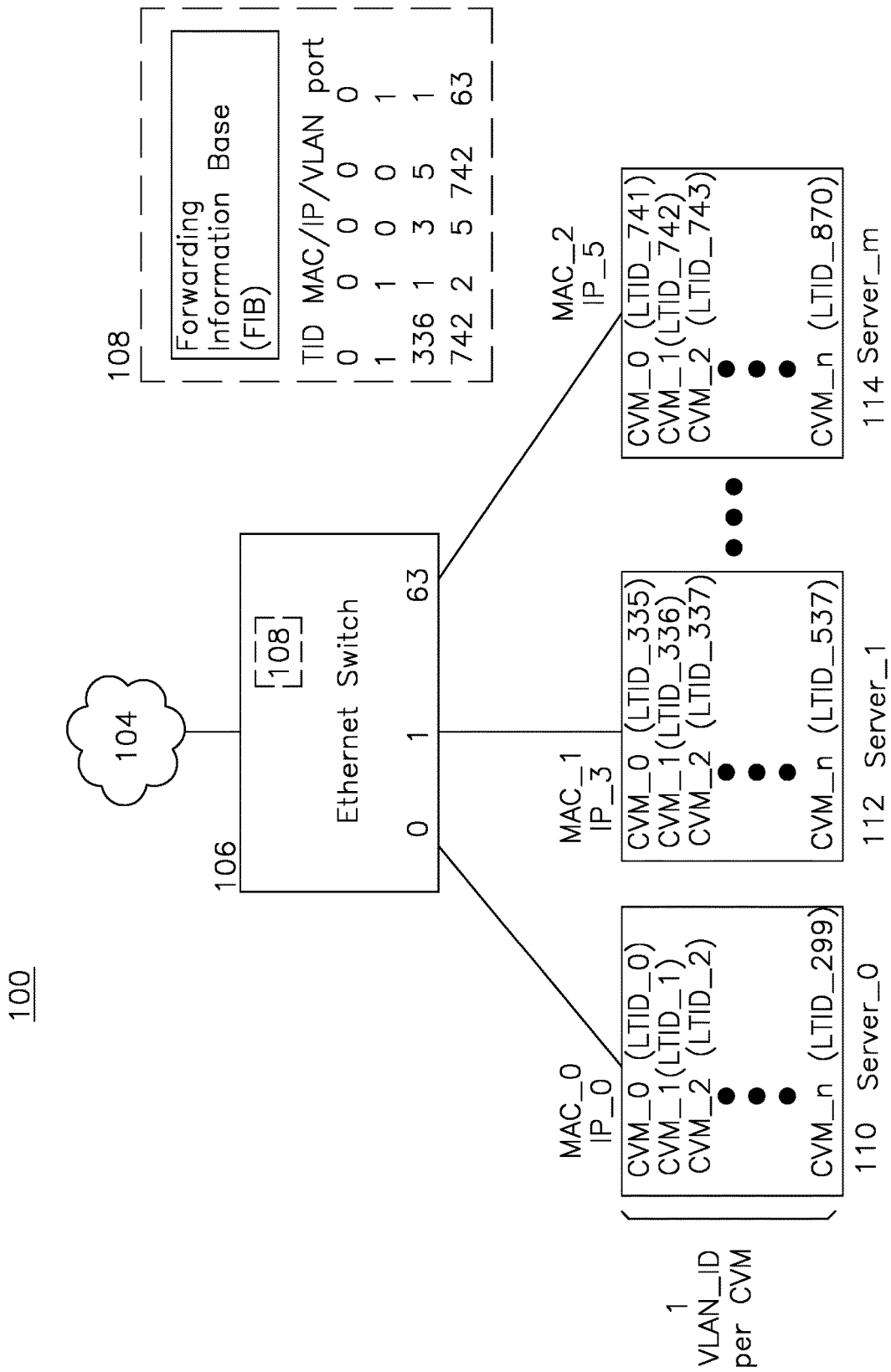
FIG. 1 shows a block diagram for a prior art Virtual machine switch.

Certain terms, elements of the invention, and associated behaviors and constraints are defined as follows:

A physical server is a hardware host computer which is addressable by MAC address or IP address. Each physical server may have a plurality of Container/Virtual Machine (CVM) processes, each CVM process addressable by a unique MAC or IP address. Each Container and/or Virtual Machine (CVM) is an independent but addressable process which may belong to or be assigned to a unique user or tenant group and have input and output which are communicated over a network using MAC address (48 bits), IP address (32 bits or 64 bits), and VLAN_ID which is a 12 bit address value limiting the number of individual user or tenant group a CVM can be assigned in a switch fabric to 4096. However, with the introduction of VxLAN technology, the number of individual user or tenant group a CVM can be assigned in a switch fabric can grow to 16 million based on the 24 bit VNID identifier of VxLAN. In the prior art of FIG. 1, the basic structure of current switch systems 100 consists of individual Virtual Local Area Network IDentifier (VLAN_ID) for each CVM operating in servers 110, 112, 114, and coupled to an Ethernet switch 106. A forwarding information base(FIB) 108 associates a Tenant IDentifier (TID) for each CVM process to a MAC address, IP address, and VLAN port. This configuration is suitable for a small number of CVMs and servers, however, this switch fabric architecture is not capable of handling concurrent communications between a huge number of CVMs with millions of user or tenant groups. Each CVM is addressable by its MAC address and VLAN_ID in its host server and the link between its host server and the leaf switch but by its MAC address and VxLAN VNID in the fabric between spine switches and leaf switches. Additionally, each CVM can be assigned an IP address, either by static configuration or using some dynamic mechanism such as Dynamic Host Configuration Protocol (DHCP). In the prior art, each fabric is only able to support hundreds of thousands of CVMs because of the design limitation in the switch systems and fabric architecture, whereas the present invention addresses this shortcoming, while providing additional addressing flexibility and freedom in grouping the CVMs to provide different quality of service for different class of cloud data center tenants and applications.

A Tenant is a collection of one or more CVMs, where each CVM is addressable by a MAC and/or IP address and a VLAN_ID in its hosting server or a VxLAN VNID in the switch fabric, i.e., a CVM is accordingly addressed by one of two methods:

a) the CVM MAC address as destination address or alternatively b) the CVM IP address as destination address, Along with a VLAN_ID in its hosting server or VxLAN VNID in the switch fabric.

The CVMs of a tenant may be located on the same physical server, or on different physical servers. Upon creation of a new CVM, the cloud data center operating system software (such as OpenStack) is responsible for assignment of a unique MAC address and a unique IP address to each CVM within the tenant. Each tenant LTID is unique for the particular host server to other tenants (with associated LTID) on that same host server, which provides a unique identification mechanism for information for a particular CVM to reach the particular tenant to which the CVM belongs. In other words, the assignment of LTID to CVMs need be identical only for CVMs on the same server. For example, a tenant A which has a CVM_1 on server 'a' and a CVM_2 also on server 'a' must have the same LTID, whereas a tenant A which has a CVM_1 on server 'a' and a CVM_2 which is on server 'b' may have the same or different LTIDs.

Each CVM has an associated GTID, which is typically assigned by the process which creates the CVM, and the GTID typically persists through the life of the CVM. The present switch fabric provides that access to the CVMs may be distributed through the switch fabric by using bits of at least one of the MAC address, IP address, or GTID. By using a plurality of spine switches 252A, 252B, to 252N of FIG.

2, each spine switch having a corresponding leaf port 259, each corresponding uplink port such as 257 of the leaf switch 202 may provide connectivity to each of the respective leaf port of the spine switches. In one example of the invention, the leaf switch uplink port may be divided into a plurality of sub-ports, each sub-port for connection to a corresponding leaf port of each of a plurality of spine switches. For a large data center with a large number of concurrent CVMs, this approach allows the individual CVMs to continue to use VLAN_ID for local addressing within each server, which preserves the current method in widespread use, while providing scaling to very large numbers of servers, in the example of FIG. 2, 64 servers per leaf switch*64 leaf switches=4096 servers, each capable of 1000 virtual machines, providing 4 million concurrent CVMs. Additionally, the slicing of Forwarding Information Base (FIB) for CVMs (each with a unique GTID and MAC/IP address) such that each spine switch is responsible for a corresponding slice of CVM's GFIB allows a larger table space lookup by distributing the lookup table space over multiple spine switches, and hence allowing a global FIB of 4M CVM to be built from 8 "thin" spine switches in FIG. 2. An example of a "thin" spine switch is a low cost single rack unit (RU) height switch made with only one single off-the-shelf switch ASIC chip with an internal table memory for 512K CVMs. Furthermore, each leaf switch uplink port can be used with a physical interface which already contains a usable uplink port subdivision, such as the industry standard QSFP28 interface (described in http://www.snia.org/sff/specifications) which provides four 25 Gbps electrical interfaces which may be either combined to form a single 100 Gbps interface, or four separate 25 Gbps interfaces for use with four spine switches 252. In one example of the invention, the use of four spine switches in the fabric may be accomplished using the QSFP28 interface at the leaf switch uplink port, which can then be subdivision using a 1 to 4 active optical cable AOC, such as part number FCBN510QE2Cxx manufactured by Finisar (10 Gbps/channel ×4 channels) or OPQS28-F-xx-A/SF28/4 by Optech (25 Gbps/channel ×4 channels) to direct each of the sub-ports to a corresponding one of four spine switch leaf ports. Alternatively, the use of multiple separate leaf switch uplink ports 257, such as 32 leaf switch uplink ports at each leaf switch allows the leaf switch to be connected to 32 "thin" spine switches 252 simultaneously. With 32 "thin" spine switches in the fabric, the total number of CVMs in the global FIB can now grow to 16 million, which will allow the server to grow its maximum CVM hosting number from 1000 to 4000. By selecting whether to use MAC or IP address for assignment of which spine switch handles certain CVMs it is possible to distribute global FIBs separately across the GFIB table slices of the spine switches by using MAC address bits for selection of which of spine switch 252A to 252N will handle uplink port packets in order to maximize the size of Layer-2 global FIB, or network traffic prioritization may be performed using IP subnet address bits (the most significant bits of IP address) to provide quality of service levels depending on IP subnet address. Since the IP address and MAC address of each CVM is also assigned at time of creation of the CVM, this also provides flexibility in the switch fabric architecture and what parameters it may optimize. Because the number of spine switches may vary from 1 to N, for clarity, references to spine switch 252 are understood to mean a single or plurality 252A to 252N for N spine switches, according to the context of use.

In another example of the invention, the selection of which particular leaf switch uplink sub-port is selected relies on a combination of two or more of: IP address, MAC address, or GTID, such as by using a mixture of bits of each. For example, in one example of the invention, it is desired for certain CVMs to receive a higher quality of service than other CVMs, and simultaneously, to provide certain CVM application processes separate route paths through different spine switches, perhaps for security, separating streams by quality of service, or other motivations. In this example, the selection of a sub-port may rely on bits of the CVM MAC destination address or CVM destination IP address as well as bits of the GTID. For 16 spine switches, the sub-port assignment may be performed using two GTID bits (where the cloud provider issues GTIDs with the selected bits set to 1 or 0, as well as the assignment of certain applications with an IP or MAC address having particular bits set to 1 or 0 for spine switch subgroup selection, and the other bits assigned for uniqueness, for example. By combining the selected GTID bits and selected IP/MAC address bits used to assign network traffic streams to a particular spine switch, the segregation of network traffic at time of CVM creation, or thereafter (by changing destination address, for example), a particular performance objective may be accomplished by the assignment of CVM destination address or GTID. The example is provided without limitation to motivation for selecting particular bits to form the particular bits which select the particular leaf switch uplink sub-port.

Figure 2:
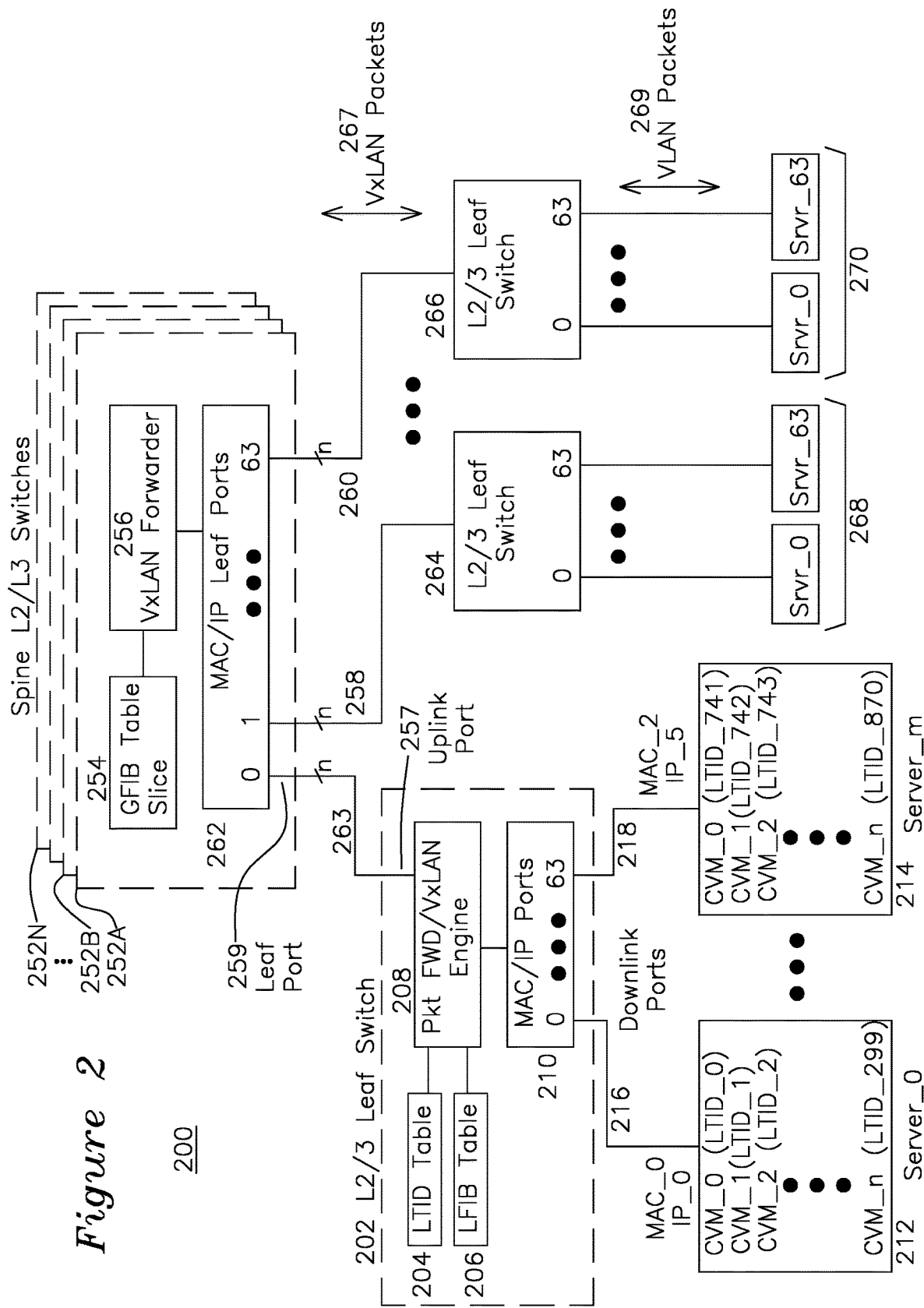
FIG. 2 shows a block diagram for a set of spine switches coupled to a plurality of leaf switches, each leaf switch coupled to a plurality of hosts including servers with CVM processes.

FIG. 2 shows an example switch fabric 200 comprising a plurality of spine switches 252A. . 252N and a plurality of leaf switches 202, 264,. . ., 266, each of the leaf switches having downlink ports such as 216. . . 218 of leaf switch 202. Each of the downlink ports 216. . . 218 is coupled to an associated server such as server_0 212 or server_m 214, and each server hosts a plurality of container or virtual machines (CVM)s as shown for server_0 212 or server_m 214. The plurality of leaf switches 202, 264, . . ., 266 each have respective uplink ports 263, 258, . . ., 260, which are connected to spine switches 252A through 252N. The number of spine switches 252A to 252N may optimally be 2 (for one bit of address/GTID), 4 (2 bits of CVM destination address or GTID), or 8 (3 bits of CVM destination address or GTID), such that which spine switch a packet on a particular uplink port is directed to may be selected by a small number of least or most significant bits of a CVM destination IP address, CVM MAC destination address, or Global Tenant IDentifier. The uplink ports 263 and 258 through 260 carry VxLAN packets 267, and downlink ports 216 to 218, etc. carry VLAN packets 269.

Each leaf switch such as 202 includes a local tenant ID (LTID) table 204 and a Local Forwarding Information Base (LFIB) table 206 which is coupled to a packet forwarding and VxLAN engine 208, which is also coupled to MAC/IP ports 210. The LTID table 204 has a first set of entries providing forward associations from Tenant_id (VLAN_ID) to GTID organized as:

DL_port_n, VLAN_ID ->Global Tenant IDentifier (GTID) and also a set of associations from GTID to VLAN_ID organized as:

DL_port_n, GTID ->VLAN_ID where:

DL_port_n references the particular downlink port of the leaf switch which is coupled to the particular server hosting the various CVMs identified by LTID (VLAN_ID), and GTID is a unique global identifier for each tenant assigned by the cloud data center operator. The downlink port may be identified by a unique IP address or unique MAC address, or by a port number, or by any method which provides unique and unambiguous identification of a downlink port for a table entry as known in the prior art.

Each of the leaf switches such as 202 has one or more associated uplink ports 257 which is used for forwarding packets which are not destined to CVMs connected to a leaf switch on its local downlink ports. The uplink ports are used by the leaf switches for sending packets in a VxLAN format to the plurality of spine switches arranged in slices shown as 252A through 252N, where the particular spine switch slice selected is based on bits of a destination address or GTID according to which GFIB slice of the Spine switch is responsible for that particular slice of destination address bits or GTID bits. The selected spine switch receives the VxLAN packets and forwards them to a different leaf switch having the destination CVM on one of its downlink ports. The Spine Switch 252 has a series of leaf ports 262 receiving VxLAN packets from the leaf switches, the leaf ports 262 are coupled to VxLAN forwarder 256, which is coupled to a GFIB table slice 254 containing a subset of all CVMs known to all of the leaf switches. The GFIB table slice 254 provides associations from GTID and MAC or IP address to a leaf port and a leaf switch associated with the particular CVM on one of its downlink ports.

Figure 3A:
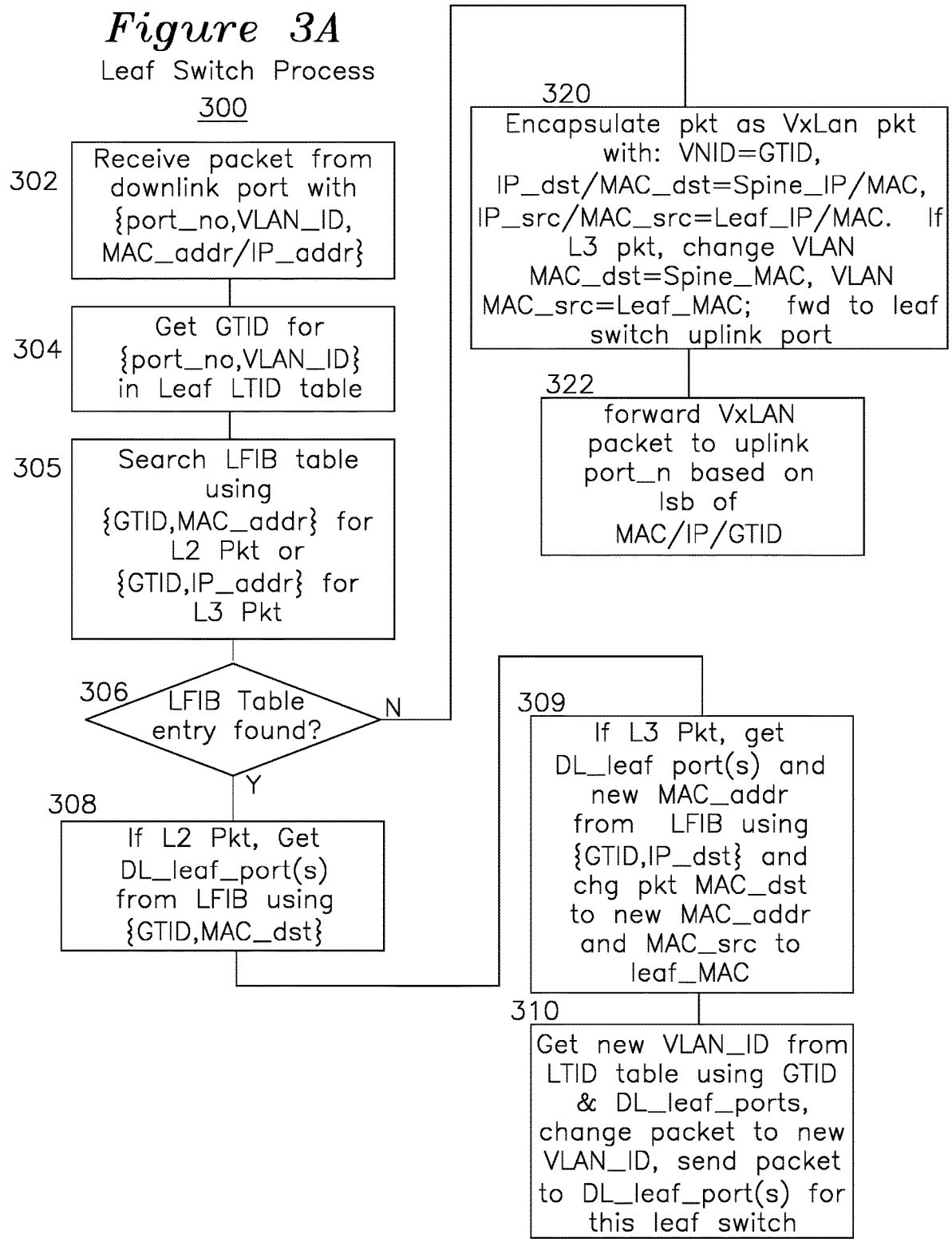
FIG. 3A shows a leaf switch downlink port process flowchart.
Figure 4A:
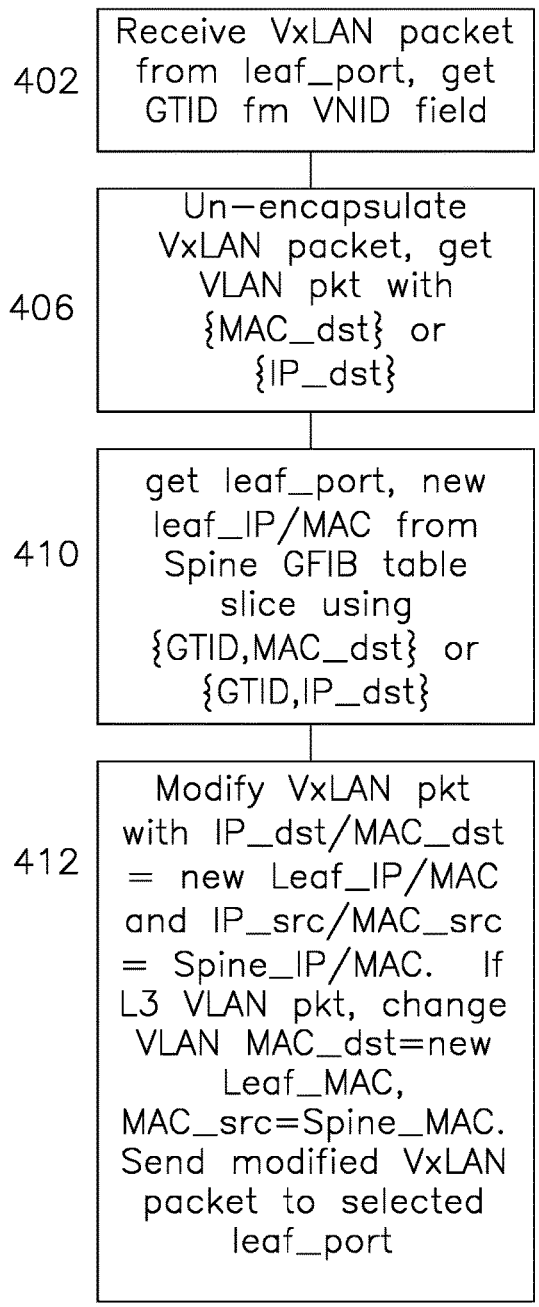
FIG. 4A shows a spine switch process flowchart.
Figure 4B:
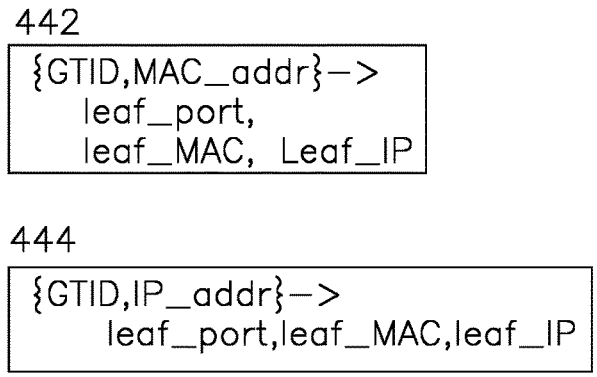
FIG. 4B shows a spine GFIB table.
Figure 5A:
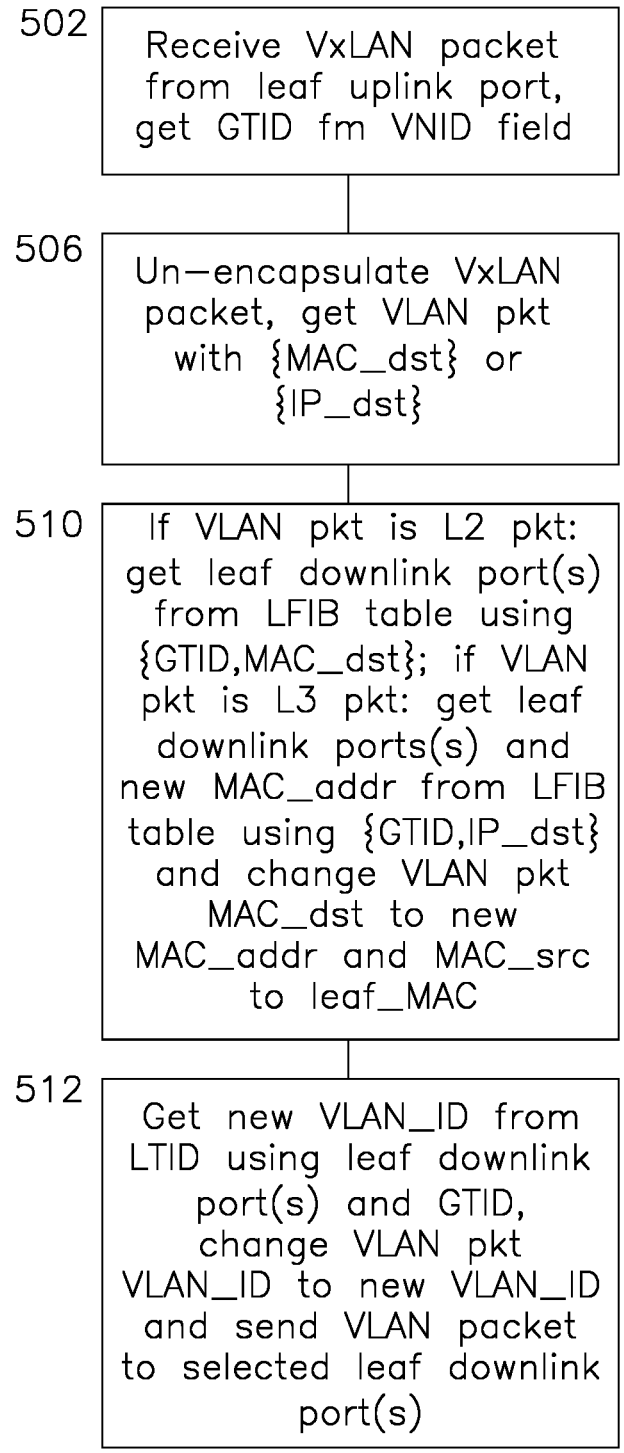
FIG. 5A shows a leaf switch uplink port process flowchart.

The various functions shown in block diagram FIG. 2 are best understood in combination with the flowchart process of FIG. 3A describing the operation of the leaf switch downlink ports, flowchart of FIG. 5A describing the operation of the leaf switch uplink ports, and FIG. 4A describing the operation of the spine switch. Additionally, FIGS. 3B and 3C describe the 204 LTID and 206 LFIB tables, respectively, maintained and used by each leaf switch, and FIG. 4B shows the GFIB table slice 254 used by the spine switch.

The process 300 of FIG. 3A describes the functions performed by the packet forwarding/VxLAN engine 208 of leaf switch 202. CVM packets are received on interface 210 and processed by packet engine 208 in step 302, which extracts the downlink port from the interface port, and the VLAN_ID (local tenant ID associated with the CVM) of the CVM packet as well as the CVM destination MAC/IP address. The engine 208 connects to the LTID table 340 and does a lookup of the GTID from the VLAN_ID and downlink port. If no matching entry is found, the packet is dropped (ignored and not processed any further). In step 305 for a matching entry, the packet forwarding engine 208 uses this GTID and MAC destination address (or destination IP address) of the CVM in the respective LFIB lookup table 352 (or 354), respectively, to lookup the leaf downlink port for the destination CVM, and when a matching entry is found 306, for layer 2 packets, sets the new leaf downlink port from LFIB using {GTID, MAC_dst} in step 308 or for layer 3 packets, sets the new leaf downlink port and gets new MAC from LFIB using {GTID, IP_dst} from the lookup operation of FIG. 3C and changes the packet MAC destination as the new MAC and packet source MAC as the leaf switch MAC in step 309, get new VLAN_ID from LTID table 342 from the new leaf downlink port and GTID, change packet VLAN_ID to new VLAN_ID and sends the packet to the given downlink port in step 310.

If the destination MAC (or IP) address is not found in the LFIB table of FIG. 3C, this is detected in step 306, which results in the VLAN packet being encapsulated into a VxLAN packet in step 320, where if the VLAN packet is a layer-3 packet, the VLAN packet MAC destination address is set to the spine switch MAC address, the VLAN packet source MAC address is set to the leaf switch MAC address, the VxLAN VNID is set to the GTID (Global Tenant ID or VxLAN VNID), the VxLAN IP and MAC source address are set to those of the leaf switch, and the VxLAN IP and MAC destination addresses are set to those of the Spine switch 252, with the VxLAN packet encapsulating the VLAN being sent to the spine switch leaf port 262 where it is processed by the spine switch 252 in step 322.

FIG. 4A describes the process steps performed by the VxLAN forwarder 256 of FIG. 2. The receiving spine switch leaf port of interface 262 transfers the packet to the VxLAN forwarder 256, which examines the GFIB table slice for the GTID value found in the VNID field of the VxLAN packet sent by the leaf switch. FIG. 4A shows the packet received in step 402 and GTID extracted, and un-encapsulated in step 406, which provides the VLAN packet and associated MAC destination address (or IP destination address) which is provided by the VxLAN forwarder 256 to the GFIB table slice 254, which uses the GTID from the VNID field in combination with either the MAC address (of table 442) or IP address (of table 444) in step 410 to extract the associated (spine switch) leaf port and leaf switch MAC address and IP address, which are used to change layer-3 VLAN packets' MAC addresses (with new MAC destination address set to the leaf switch MAC address and new source MAC address set to be the spine switch MAC address) and form the respective destination addresses of a new VxLAN packet which is sent to the selected leaf port in step 412.

FIG. 5A describes the process 500 for a packet received on a leaf switch uplink port from the spine switch 252 (for the case of a CVM packet switched from a different leaf switch through the spine switch 252 and to the present leaf switch). The VxLAN engine 208 receives the incoming spine switch leaf port packet in step 502, and gets the GTID from the VNID field of the VxLAN packet. In step 506, the VxLAN is un-encapsulated to retrieve the respective MAC or IP destination address of the VLAN packet which was encapsulated, the recovered VxLAN GTID value and VLAN MAC (or IP) address are applied to the FIG. 3C LFIB table, which provides the destination leaf downlink port and destination CVM MAC address for layer-3 packets from table 354 in step 510. In step 512, the VxLAN forwarder 256 retrieves the new VLAN ID from LTID table 342 using the destination leaf downlink port and GTID, changes the VLAN packet VLAN_ID to the new VLAN_ID, changes the VLAN packet MAC destination to the destination CVM MAC address, changes the VLAN packet source MAC to the leaf switch MAC address, and sends the VLAN packet to the destination spine switch leaf port (coupled to the selected leaf switch uplink port), where the packet is directed to the associated CVM by the selected leaf switch.

FIG. 6 shows additional details on the uplink interface from two leaf switch to the spine switches for the case n=8. Each of the m leaf switches has n uplink ports which are coupled to a respective port of the n spine switches, thereby forming a mesh that allows multiple direct paths from any server connected to any leaf switch to any other server connected to any other leaf switch through one of the spine switches. The architecture of the present invention provides that any number n of spine switches may be connected to each leaf switch, where the fabric may have m leaf switches as shown in FIG. 6 with just two of m leaf switches shown for interconnection clarity. When sizing the switch fabric initially, in one example, it may be useful to first determine the number of spine switches required, by dividing the total number of CVMs to be supported by the available size of the GTID table of each spine switch, and then multiply by a safety factor in the range of 1 to 4 to accommodate for imbalances in network traffic paths or number of connections in each spine switch. Each leaf switch uplink port may then be divided into the required number of sub-ports, one for each spine switch. Alternatively, each uplink sub-port may be physically present as a separate uplink port, one for each spine switch as will be discussed for FIG. 6. The particular uplink sub-port selection will be made based on CVM destination address or GTID, as was described. Each uplink port of FIG. 2 (shown in detail in FIG. 6) is arranged with the number of uplink ports n on each leaf switch is the same for all leaf switches. FIG. 6 shows a typical leaf switch 0 202, with associated packet forwarding and VxLAN engine 208 of FIG. 2 coupled to a packet slicer function 602 operative under control of a slice configurator 604, which informs the packet slicer 602 which address to use from the VxLAN packet from 208, typically un-encapsulating the VxLAN packet to extract either the underlying VLAN Layer 2 MAC destination address, the underlying VLAN Layer 3 IP address, or the GTID which is available from the VxLAN packet directly. In the example of FIG. 6 for n=8, the 3 least significant bits (LSB) of the address or GTID are sent to packet slicer 602, with address or GTID ending in binary '000' directed to 252A, '001' directed to 252B, . . ., and '111' directed to 252H. Other bits may be generally used, the LSB example is for understanding the invention only. The slice configuration is a static or dynamic value which may be set up during the switch fabric initialization phase by the cloud operator responsible for generation of the CVMs or this may be done using control plane software which performs the task of reassigning table entries across old and new spine switches. Preferably, the slice configuration may be maintained throughout the operation of the spine switch and reconfigured during a spine switch failure, or by reassignment of CVM paths after addition of additional spine switches, as the leaf switch uplink sub-port assignments also define network traffic paths. For example, if a comparatively small number of GTIDs ending in '000' is assigned to high priority network traffic, and a comparatively large number of GTIDs ending in '111' is assigned to low priority network traffic, switch 252A will be lightly loaded compared to 252H, giving high priority network traffic greater throughput. In certain configurations, it may be preferable for the switch fabric to operate with slice configurator selecting lower order bits of the VLAN MAC address (after encapsulation of the VxLAN packet), which may provide a much larger Layer-2 global FIB for layer-2 application focused fabric. Alternatively, the slice configurator 604 may be operative across the fabric to operate on low order bits of the IP destination address of the VLAN packet (CVM IP destination address), which will tend to support a larger number of CVMs with layer-3 based applications. For network traffic grooming and selection of certain streams to provide greater quality of service, it may be preferable to segregate network traffic across the spine switches using GTID, which is assigned by the process generating the CVM. Example providers which have processes for CVM generation are Amazon Web Services (AWS), and Google Cloud Services.

FIG. 7 shows a packet format for a VLAN packet 702 used on the leaf switch downlink ports, which in the present example is shown as an IEEE 802.11q packet, although other packet types which provide equivalent functionality may be substituted without loss of generality. VLAN packet 702 has a preamble 704 for physical layer data recovery synchronization, and the known layer 2 fields 706, including L2_dst MAC destination address, L2_src source MAC address, 802.1Q header which includes the VLAN_ID, and a type field. The IP payload part 708 includes IP source and destination addresses, and the packet ends with a frame check sequence (or cyclic redundancy check) CRC/FCS 710 which operates over the entire packet to verify data integrity.

For a layer-2 VLAN packet from a host server to a leaf switch, the L2_source address (L2_src) will contain the packet sourcing CVM MAC address, the L2_destination address (L2_dst) will contain the packet destination CVM MAC address, the VLAN_ID will contain source CVM's local tenant ID, and any data following 706 will be packet payload. Note that the inner layer-2 VLAN packet inside the VxLAN packet will remain unchanged when switched from the source leaf switch to the spine switch and then from the spine switch to the destination leaf switch. On the other hand, for a layer-2 VLAN packet from a leaf switch to a host server, the L2_src, L2_dst and the packet payload will remain unchanged but the VLAN_ID will now be changed to the destination CVM's local tenant ID.

For a layer-3 VLAN packet from a host server to a leaf switch, the L2_src will contain the packet sourcing CVM MAC address, the L2_dst will contain the leaf switch MAC address, the VLAN_ID will still contain source CVM's local tenant ID, and packet payload will now contain the IP_src as the sourcing CVM IP address and IP_dst as the destination CVM IP address. Note that the MAC addresses of the inner layer-3 VLAN packet inside the VxLAN packet from the source leaf switch to the spine switch will be changed as follows: L2_dst to spine switch MAC address and L2_src to source leaf switch MAC address. Similarly, the MAC addresses of the inner layer-3 VLAN packet inside the VxLAN packet from the spine switch to the destination leaf switch will be changed as follows: L2_dst to destination leaf switch MAC address and L2_src to spine switch MAC address. On the other hand, for a layer-3 VLAN packet from a leaf switch to a host server, the L2_src will contain the destination leaf switch MAC address, L2_dst will contain destination CVM MAC address, the VLAN_ID will now be changed to the destination CVM's local tenant ID while the IP_src and IP_dst remain unchanged.

FIG. 8 shows a VxLAN 802 packet as used in leaf to spine communications. An example format is described in the internet engineering technical foundation (ietf.org) RFC7348, which is known as an "encapsulation" format, since the fields of one packet are included in their entirety in another. In the present instance, field 814 of the VxLAN is the extents shown of FIG. 7, which includes the entire VLAN packet of FIG. 7 from layer 2 header 706 to payload 708. The VxLAN frame 802 starts with a preamble 804 as before, followed by its own VxLAN L2 outer MAC header 806 with Vx_dst and Vx_src fields for layer 2 routing of the VxLAN packet, followed by outer IP header fields 808, which include a protocol type field, header checksum, outer IP source and outer IP destination fields. The outer MAC and outer IP addresses are used for routing of the VxLAN packet between spine switch interface and leaf switch interface of the uplink ports. The Outer IP header 808 is followed by the VxLAN UDP fields 810, and VxLAN header 812, where the VNID field is used to communicate the GTID associated with the VLAN packet 814. The VxLAN packet 802 terminates with the FCS computed over all fields as in FIG. 7.

For a VxLAN packet from a (source) leaf switch to a spine switch, the outer L2_src/IP_src will contain the (source) leaf switch MAC/IP address, while the L2_dst/IP_dst will contain the spine MAC/IP address. On the other hand, for a VxLAN packet from a spine switch to a (destination) leaf switch, the outer L2_src/IP_src will contain the spine switch MAC/IP address, while the L2_dst/IP_dst will contain the (destination) leaf switch MAC/IP address.

Figure 9A:
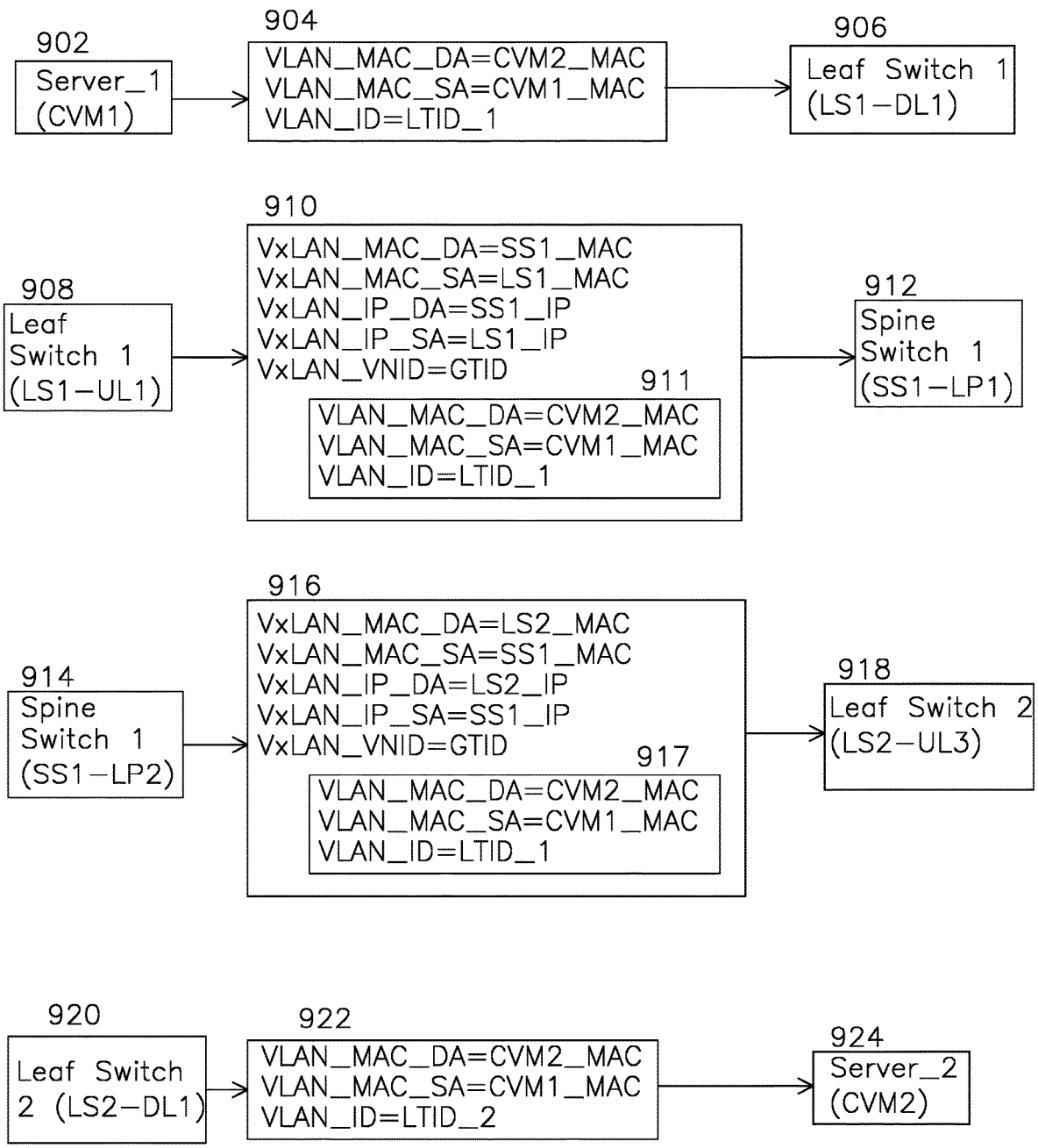
FIG. 9A shows layer 2 packet field modifications when moving through the switch fabric.
Figure 9B:
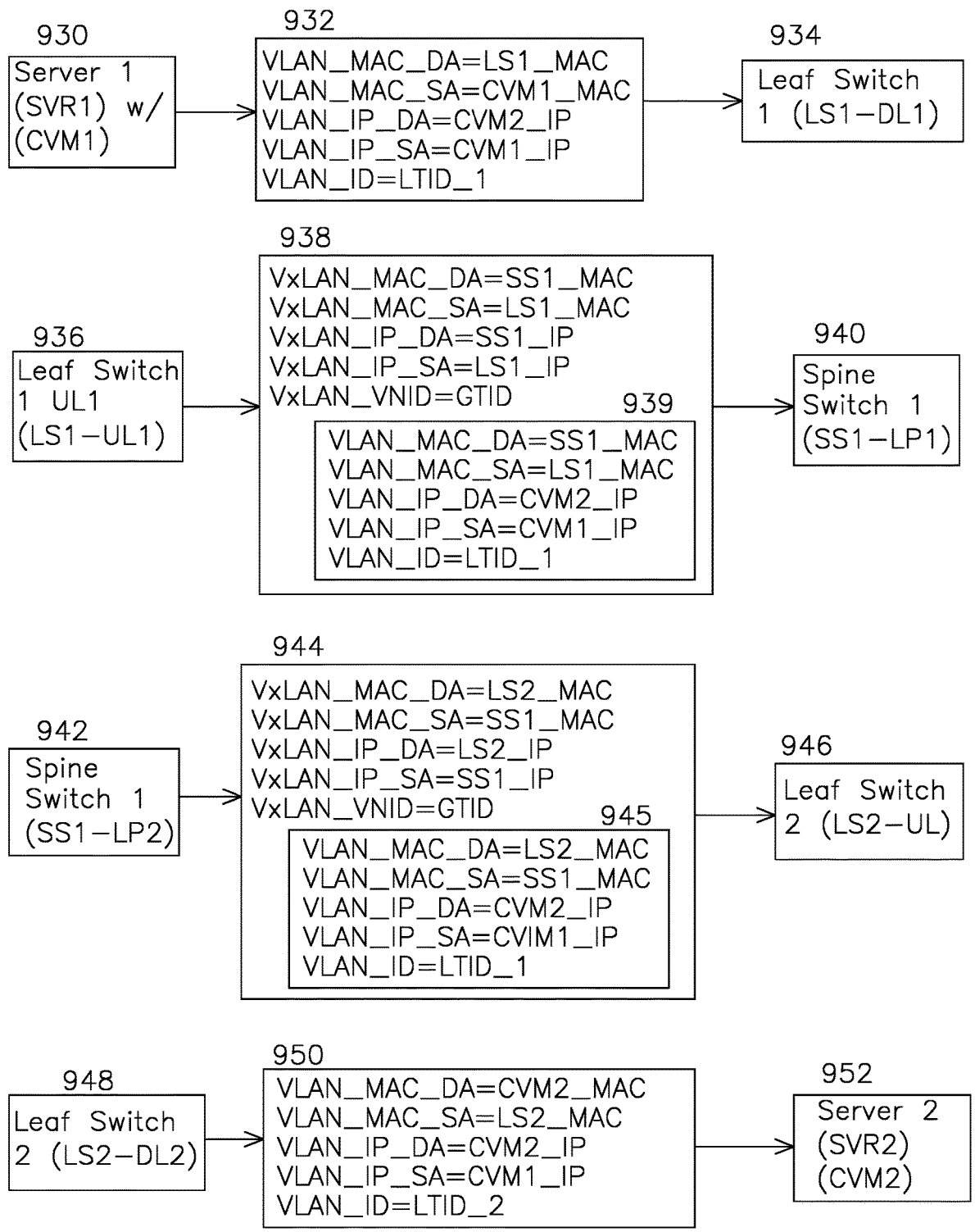
FIG. 9B shows layer 3 packet field modifications when moving through the switch fabric.

FIGS. 9A and 9B shows example packet handling for a layer 2 or layer 3 packet, respectively, from virtual machine CVM1 hosted by server SVR1 (such as CVM_1 of server_0 212 of FIG. 2) to virtual machine CVM2 hosted by a server SVR2 on a different leaf switch (such as a server hosting CVM2 on leaf switch 266 of FIG. 2), requiring a path through one of the spine switches 252. It should be noted that each CVM may have its own unique MAC address and IP address, which is completely independent from the MAC and IP address of the physical server which hosts the CVM process.

FIG. 9A shows server_1 902 which hosts many CVMs, including CVM1 which generates the VLAN packet 904 shown with MAC destination address (VLAN_MAC_DA) set to the MAC address of CVM2 and MAC source address (VLAN_MAC_SA) set to the MAC address of CVM1, and the VLAN_ID set to a local tenant ID value (LTID_1), directing the packet to an associated leaf switch downlink port (LS1_ DL1) such as link 216 of FIG. 2. A VxLAN packet 910 is formed and transmitted by the leaf switch 908 uplink port to an associated spine switch 252 leaf port. As was described for detail FIG. 6, each leaf switch uplink port is configurable to multiple sub-ports, allowing the VxLAN packet formed by VxLAN engine 208 to be directed to any of several spine switches 252 based on bits of the destination CVM layer 2 (MAC) address, CVM layer 3 (IP) destination address, or GTID, where the number of spine switches 252A to 252n is determined by the number n of bits of MAC or IP destination address or GTID used, the number of spine switches used equal to $2^n$ based on the n bits of address or GTID used. The VxLAN packet 910 includes inner VLAN packet 911 received from 902, with the VxLAN MAC and IP destination addresses set to those of SS1, respectively, and VxLAN MAC and IP source addresses set to LS1, respectively, as shown. The indication LS1-UL1 908 indicates Leaf Switch 1 uplink port 1, corresponding to Spine switch 1 leaf port 1 of 912. The VxLAN forwarder 262 of the associated spine switch forms packet 916 which is sent from spine switch 1 leaf port 2 914 to example leaf switch 2 uplink port 3 noted in 918. Example leaf switch 2 then sends packet 922 from its downlink port LS2-DL1 to server 2 hosting CVM2 924, with the VLAN engine of the respective leaf switch modifying the de-encapsulated packet 917 with the associated LTID_2 as shown.

FIG. 9B shows the analogous processing where the switch is operating on layer 3 IP addresses. In this example CVM1 hosted by server 1 930 generates packet 932 which is shown with MAC destination address (VLAN_MAC_DA) set to the MAC address of Leaf Switch 1 and MAC source address (VLAN_MAC_SA) set to the MAC address of CVM1, and the VLAN_ID set to a local tenant ID value (LTID_1), but with the added IP destination address (VLAN_IP_DA) set to be the IP address of CVM2 and IP source address (VLAN_IP_SA) set to be the IP address of CVM1, as shown in the present example, directed to leaf switch downlink port 1 934. The associated leaf switch VxLAN engine of leaf switch 936 forms VxLAN packet 938 containing VLAN packet 939 which is modified from VLAN packet 932 as shown. The associated spine switch 942 next modifies the VxLAN addresses as shown in packet 944 and modifies the VLAN MAC address as shown in packet 945 for delivery to the uplink port of leaf switch 2 (LS2-UL). The leaf switch 2 downlink port 948 delivers packet 950 to server 2 hosting CVM2 of 952. When the packets are Layer 3 IP packets, the encapsulated VLAN source and destination addresses may be rewritten as shown in 939 and 945.

As was described earlier, the leaf switch uplink may be divided into sub-ports using a combination of bits from GTID, IP address, or MAC address. The table below illustrates an example bit mapping where the connections are divided into Premium Tenants, regular tenants, mission critical applications, and best effort applications, according to the separation of CVMs to particular servers and route paths. In the below example, a remapping may also be done such that 4 bits of GTID and address resolve to 8 spine switches rather than 16, such that Premium Tenants and Mission Critical Applications are both directed to spine switches [0. . 3] and other network traffic routed to spine switches [4. . 7].

TABLE 1

| Table Lookup Keys | | | | Lookup Result Switch | |
| --- | --- | --- | --- | --- | --- |
| GTID[23:16] | IP[31:24] | IP[7:0] | MAC[7:0] | Number | Notes |
| 11****** | ******** | ******00 | ******** | 0 | Premium |
| 11****** | ******** | ******01 | ******** | 1 | Tenants |
| 11****** | ******** | ******10 | ******** | 2 | |
| 11****** | ******** | ******11 | ******** | 3 | |
| 10****** | ******** | ******00 | ******** | 4 | Regular |
| 01****** | ******** | ******00 | ******** | 4 | Tenants |
| 00****** | ******** | ******00 | ******** | 4 | |
| 10****** | ******** | ******01 | ******** | 5 | |
| 01****** | ******** | ******01 | ******** | 5 | |
| 00****** | ******** | ******01 | ******** | 5 | |
| 10****** | ******** | ******10 | ******** | 6 | |
| 01****** | ******** | ******10 | ******** | 6 | |
| 00****** | ******** | ******10 | ******** | 6 | |
| 10****** | ******** | ******11 | ******** | 7 | |
| 01****** | ******** | ******11 | ******** | 7 | |
| 00****** | ******** | ******11 | ******** | 7 | |
| ... | ... | ... | ... | ... | |
| ******** | 00****11 | ******** | ******00 | 0 | Mission |
| ******** | 00****11 | ******** | ******01 | 1 | Critical |
| ******** | 00****11 | ******** | ******10 | 2 | Applications |
| ******** | 00****11 | ******** | ******11 | 3 | |
| ******** | 00****10 | ******** | ******00 | 4 | Best Effort |
| ******** | 00****01 | ******** | ******00 | 4 | Applications |
| ******** | 00****00 | ******** | ******00 | 4 | |
| ******** | 00****10 | ******** | ******01 | 5 | |
| ******** | 00****01 | ******** | ******01 | 5 | |
| ******** | 00****00 | ******** | ******01 | 5 | |
| ******** | 00****10 | ******** | ******10 | 6 | |
| ******** | 00****01 | ******** | ******10 | 6 | |
| ******** | 00****00 | ******** | ******11 | 6 | |
| ******** | 00****10 | ******** | ******11 | 7 | |
| ******** | 00****01 | ******** | ******11 | 7 | |
| ******** | 00****00 | ******** | ******11 | 7 | |

Packet encapsulation may be generally done, the overall objective of packet encapsulation is to provide a means of transport whereby the original packet to be transported is surrounded by a new header which contains the local routing information (layer 3 such as IP and/or layer 2 such as MAC) source and destination addresses, where the MAC addresses are typically link layer addresses and IP addresses may be one or more hops away. De-encapsulation is then done at the end station to restore the original packet (such as VLAN), along with any other end-station VLAN address modifications.

The VxLAN example was selected to provide understanding of a mechanism to carry the GTID in an easily accessible header field of VxLAN while the VLAN packet was encapsulated in the payload of the VxLAN packet. However, this function may be more generally performed. In another variation of the invention, other encapsulation methods may be substituted for the VxLAN encapsulation, where the encapsulation contains the VLAN packet as described for VxLAN and carries the GTID field in the encapsulation packet header or other readily accessible location. Any alternative encapsulation method may be used which carries the GTID outside the encapsulated packet, including MPLS, which has a 20 bit MPLS label header field which may be used to convey a 20 bit GTID, or other header fields of MPLS may also be used to convey a 24 bit GTID as provided by VxLAN while carrying the encapsulated VLAN packet. Alternatively, a form of transmission using standard VLAN packets in a format called "double-tag VLAN" for distinguishability may be used, where the VLAN tag (which does not have a sufficient number of header VLAN_ID bits) is understood to be transmitted in pairs, the double-tag VLAN packet comprising a first and second VLAN tag, each of which carries parts of a 24 bit GTID, and for which the double-tag VLAN packet MAC, IP and payload remain the same as the VLAN packet to be transmitted. This is given only as an example, as there are many ways of encapsulating VLAN packets beyond VxLAN which accomplish the objects of the invention. Most broadly, it is understood that the minimum communication requirement of encapsulation between the leaf switch uplink port and associated spine switch is to provide a readily accessible GTID field in an encapsulation packet header field with the encapsulated VLAN packet, which is destined for un-encapsulation (extraction of the underlying VLAN packet) and transport as a VLAN packet at a different leaf switch.

In an example of encapsulation using a double-tag VLAN packet, a single VLAN tag (which represents the 12-bit LTID) of an original VLAN packet which originated from a leaf switch downlink from a server sending the original VLAN packet is converted into 2 VLAN tags (which combined together, represent the 24-bit GTID) by the leaf switch which receives it. After conversion to double-tag VLAN packet by the leaf switch, the double-tag VLAN packet is processed thru the spine switch, after which the destination leaf switch will change the double-tag VLAN packet back to the (1-tag) VLAN packet before sending packet to the destination server. If the original VLAN packet is a layer-2 packet, all the other fields in the double-tag VLAN packet will remain the same as the original VLAN packet. If the original VLAN packet is a layer-3 packet, the MAC address of the double-tag VLAN packet will be changed along the way from sourcing server to sourcing leaf, to spine, to destination leaf, and to destination server, in the same manner as the MAC address of the original VLAN packet inside the VxLAN packet would be modified, while the IP address and payload in the double-tag VLAN packet will remain the same as the original VLAN packet. In this variation of encapsulation the mechanism for encapsulation is more efficient than VxLAN previously described. Other encapsulation methods may be used, these are described as examples only.

A data center network contains a plurality of switch fabrics and a plurality of cross fabric spine (CFS) switches, each with a plurality of spine ports for interconnecting with spine switches in each switch fabric.

Figure 10:
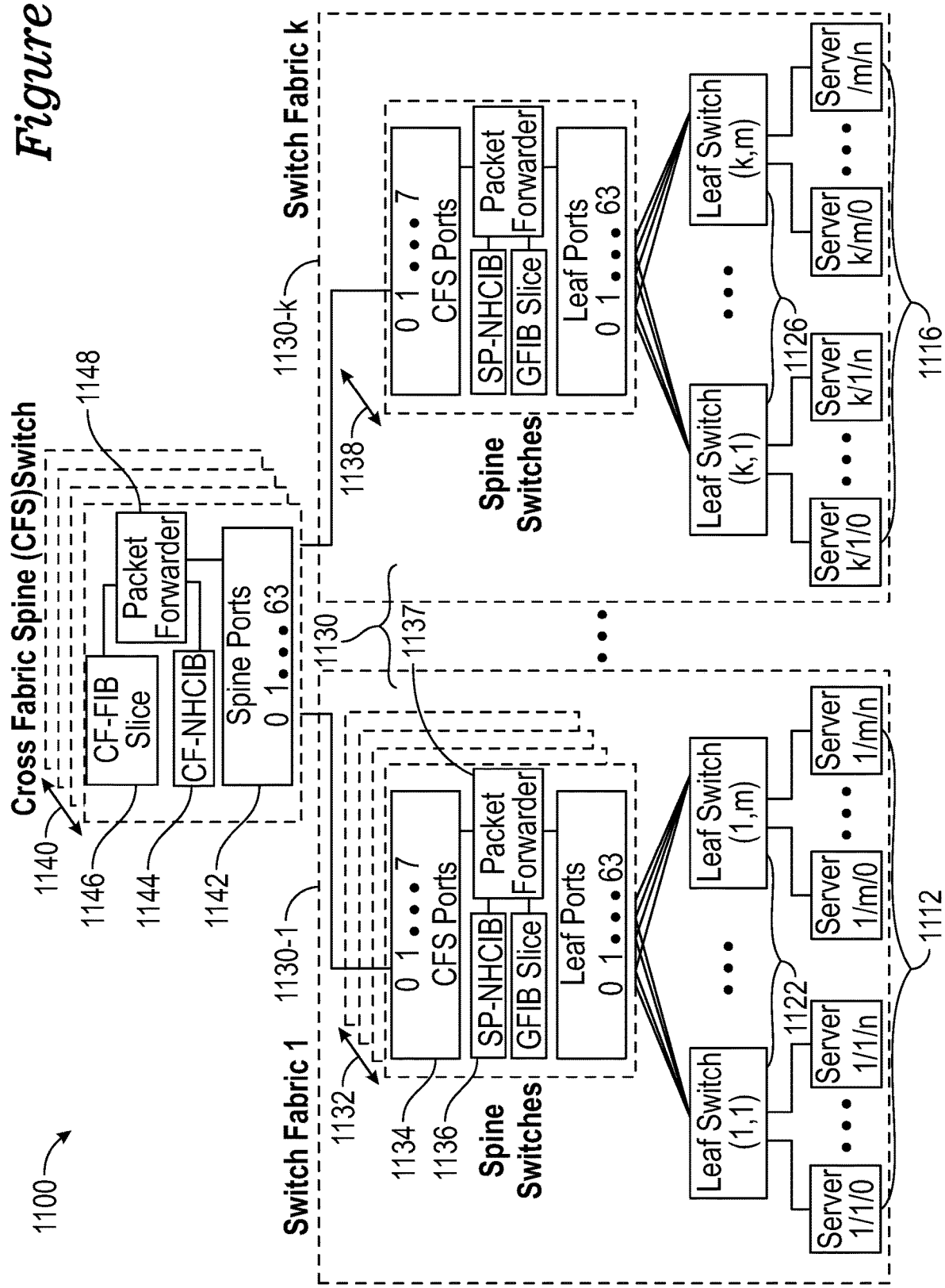
FIG. 10 shows a block diagram for a set of CFS switches coupled to a plurality of spine switches in different switch fabrics, each spine switch coupled to a plurality of leaf switches and each leaf switch coupled to a plurality of servers hosting a plurality of CVM processes.

FIG. 10 builds on the spine and leaf architecture of FIG. 2 to scale to greater numbers of CVMs in an expanded switch fabric. FIG. 10 shows an example data center network 1100 comprising a plurality of Cross-Fabric Spine (CFS) switches 1140 interconnecting with a plurality of switch fabrics 1130 (1130-1 through 1130-k) and each switch fabric contains a plurality of spine switches 1132, 1138 coupled with a plurality of leaf switches 1122, 1126 and each leaf switch coupled with a plurality of servers 1112, 1116, which host a plurality of Container/Virtual Machines (CVM), each spine switch having the additions of a plurality of CFS ports 1134 coupled to the CFS switch spine ports 1142 for transmitting and receiving packets to CFS switches, and SPine Next Hop Cross Fabric Switch (SP-NHCIB) 1136 coupled to the spine switch packet forwarder 1137 for additional packet processing, each CFS switch having a plurality of spine ports 1142 for transmitting and receiving packets to and from spine switches, a packet forwarder 1148 for switching packets between fabrics coupled with Cross Fabric Next Hop Capability Information Base (CF-NHCIB) 1144 which contains the capability information of each and every spine switch in the data center and Cross Fabric Forwarding Information Base (CF-FIB) table slice 1146 which contains the information about those CVMs which have been moved around between switch fabrics. FIG. 10 is best understood in combination with the previously described operations of FIG. 2, with the addition of hierarchical CFS switches 1140 interconnecting the switch fabric 1130.

Figure 11:
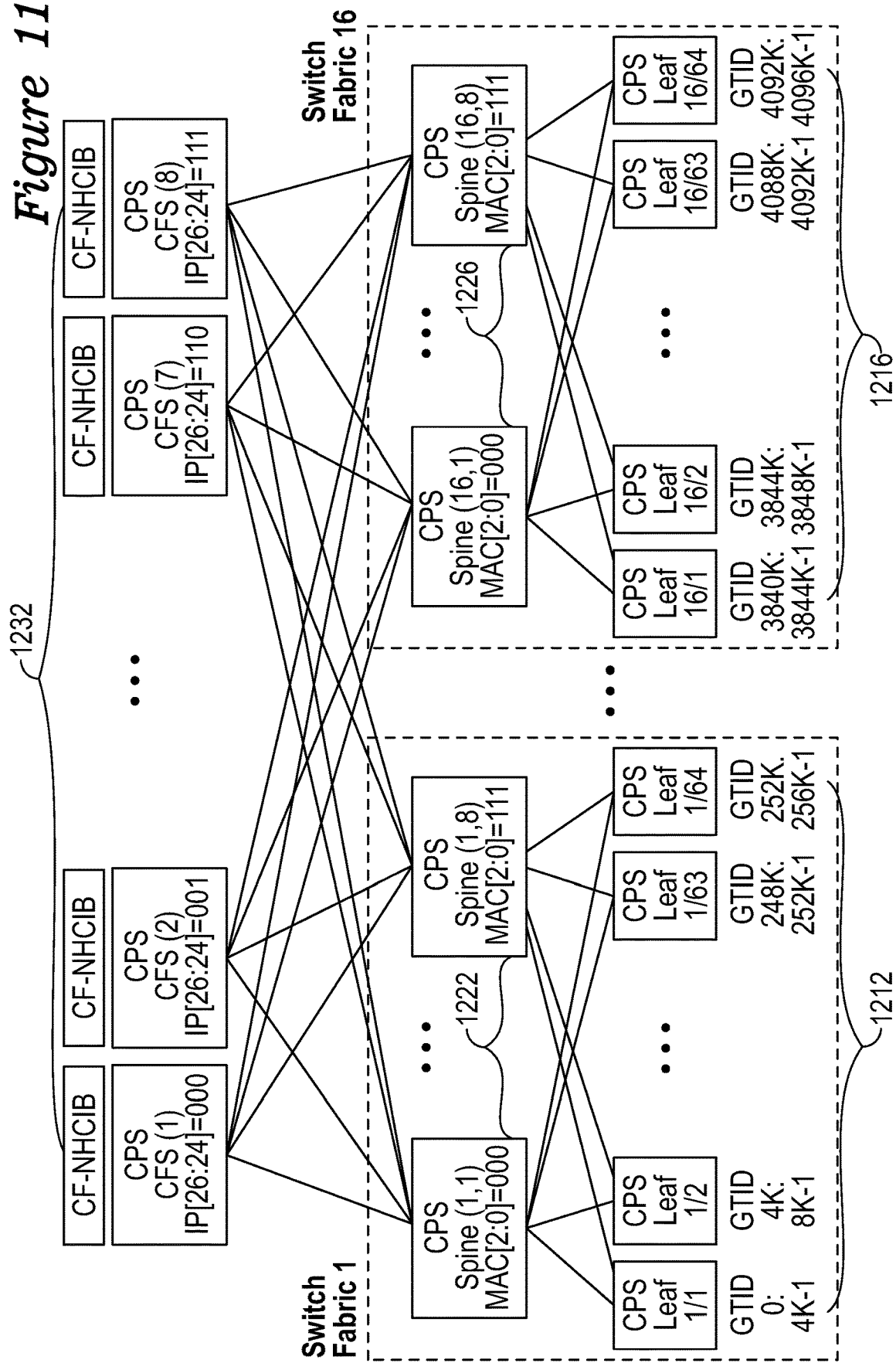
FIG. 11 shows an example block diagram of a data center network consisted of 8 CFS switches, 16 switch fabrics with 8 spine switches and 64 leaf switches per switch fabric.

FIG. 11 shows an example of reliable message connections between the control plane software (CPS) of the leaf switches, spine switches and CFS switches inside a data center network. In this example, the CVMs created inside the hosts under each leaf switch will carry a Global Tenant ID (GTID) spanning a range of 4K (4096). For example, a CVM created under leaf switch 1 in switch fabric 1 will have a GTID ranging from 0 to 4K-1, leaf switch 2 in switch fabric 1 will have a GTID ranging from 4K to 8K-1, leaf switch 64 in switch fabric 1 will have a GTID ranging from 252K to 256K-1, leaf switch 64 in switch fabric 16 will have a GTID ranging from 4092K to 4096K-1, etc. 1212, 1216. Furthermore, each spine switch (one of 1132 or 1138) in each switch fabric will be configured to handling network traffic to CVMs with different least significant 3 bits of CVM MAC address. For example, spine switch 1 in each fabric will be configured to handle switch fabric network traffic to CVMs with least significant 3 bits of MAC address equal to 000, spine switch 2 equal to 001, spine switch 8 equal to 111, etc, such as the spine switches of 1222 and 1226. While CFS switches will be configured to handling network traffic to CVMs with different IP subnet address. For example, CFS switch 1 will be configured to handle network traffic to CVMs with IP subnet address bits 26 to 24 equal to 000, CFS switch 2 equal to 001, CFS switch 8 equal to 111, etc, 1232. With this data center network configuration after data center network initialization is completed, the CF-NHCIB in the CFS switches will be constructed as follows:

| Fabric | Spine | GTID | IP Addr | MAC Addr Bits 2, 1, 0 |
|---|---|---|---|---|
| 1 | 1 | 0:256K-1 | Don't Care | 000 |
| 1 | 2 | 0:256K-1 | Don't Care | 001 |
| ... | ... | ... | ... | ... |
| 1 | 8 | 0:256K-1 | Don't Care | 111 |
| 2 | 1 | 256K:512K-1 | Don't Care | 000 |
| 2 | 1 | 256K:512K-1 | Don't Care | 001 |
| ... | ... | ... | ... | ... |
| 2 | 8 | 256K:512K-1 | Don't Care | 111 |
| 16 | 1 | 3840K:4096K-1 | Don't Care | 000 |
| 16 | 2 | 3840K:4096K-1 | Don't Care | 001 |
| ... | ... | ... | ... | ... |
| 16 | 8 | 3840K:4096K-1 | Don't Care | 111 |

Figure 12:
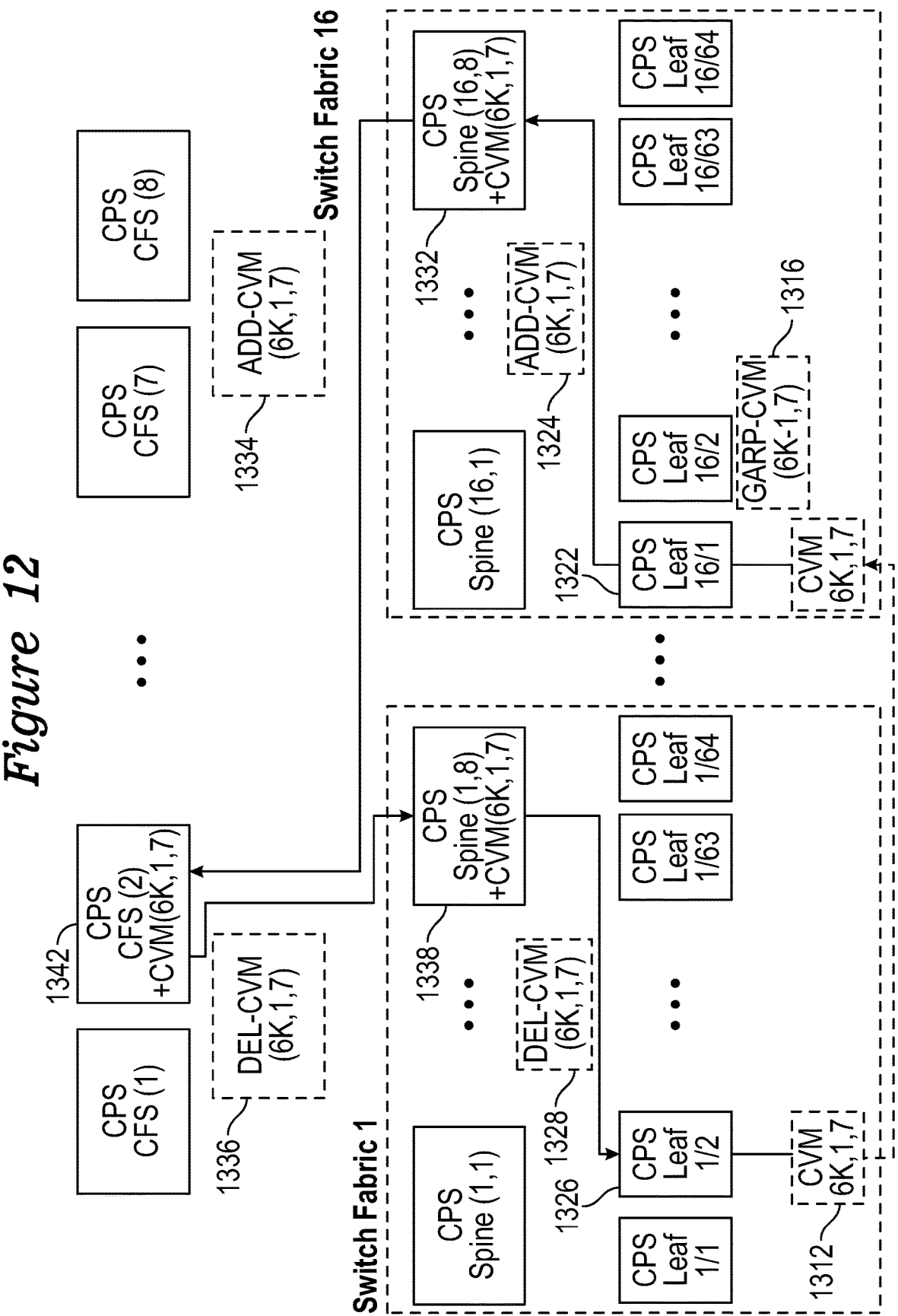
FIG. 12 shows message flows of a CVM update process for a CVM of GTID=6K, MAC[2:0]=111 and IP[26:24] =001 being moved from leaf switch 2 in switch fabric 1 to leaf switch 1 in switch fabric 16.

FIG. 12 shows an example of a CVM update process when a CVM-A (CVM with GTID=6K, IP[26:24]=001 and MAC[2:0]=111) 1312 under leaf switch 2 in switch fabric 1 is moved to under leaf switch 1 in switch fabric 16. When CVM-A is first moved into a host under leaf switch 1 in switch fabric 16 1322, it will send out a GARP packet 1316 to announce its presence to the CPS of leaf switch 1 in switch fabric 16 1322, which will add CVM-A into its LFIB and then send an ADD-CVM message to the CPS of spine switch 8 in switch fabric 16 1332 because CVM-A's MAC [2:0]=111 and spine switch 8 is configured to handle MAC [2:0]=111. When the CPS of spine switch 8 in switch fabric 16 1332 receives an ADD-CVM-A message, it will add CVM-A into its GFIB slice and then relay this ADD-CVM-A message to the CPS of CFS switch 2 1342 because CVM-A's IP[26:24]=001 and CFS switch 2 is configured to handle IP[26:24]=001. When the CPS of CFS switch 2 receives an ADD-CVM-A message, it will add CVM-A into its CF-FIB table slice, then send a delete CVM-A (DEL-CVM-A) message to the CPS of spine switch 8 in switch fabric 1 1338 because in its CF-NHCIB, spine switch 8 in switch fabric 1 is responsible for handling network traffic to CVMs with MAC[2:0]=111 and GTID in the range of 0 to 256K-1. When the CPS of spine switch 8 in switch fabric 1 1338 receives a DEL-CVM-A message, it will delete CVM-A from its GFIB slice and then relay this DEL-CVM-A message to the CPS of leaf switch 2 in switch fabric 1 1326 because CVM-A's GTID=6K is within the GTID range of leaf switch 2 in switch fabric 1. When the CPS of leaf switch 2 in switch fabric 1 receives a DEL-CVM-A message, it will delete CVM-A from its LFIB and that completes the CVM update process for CVM-A.

Figures 13B, 14A:
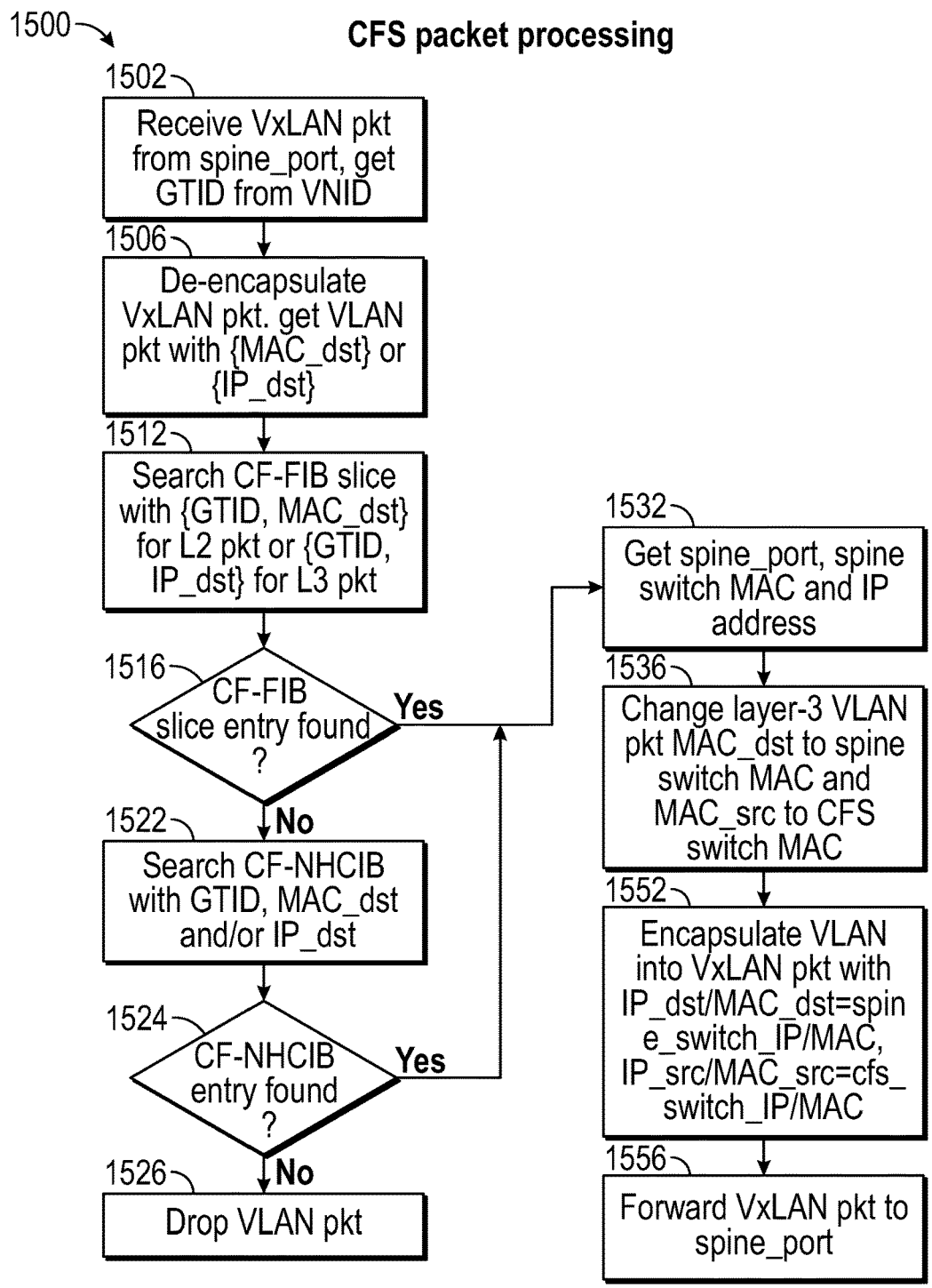
FIG. 13B shows the mapping of SP-NHCIB in the spine switch.
FIG. 14A shows a CFS switch packet processing flowchart.

FIG. 13A shows the flowchart of a modified spine switch packet processing. From step 406 in FIG. 4A, in step 1404 the spine switch will search its GFIB slice for a matching entry with GTID and VLAN packet destination address. In step 1406, if a matching GFIB slice entry can be found, spine switch will continue the processing from step 410 in FIG. 4A. Otherwise, in step 1408 the spine switch will check if the packet was received from a leaf port. If yes, in step 1412 spine switch will use the GTID from the VNID field in combination with VLAN packet MAC destination address and/or destination IP address to match the SP-NHCIB table (table 1462 in FIG. 13B) in order to select the CFS port, CFS switch MAC address and CFS switch IP address. In step 1416 if the VLAN packet is a layer-3 packet, spine switch will modify the VLAN packet MAC destination address to the selected CFS switch MAC address and the VLAN packet MAC source address to its own MAC address. In step 1422 spine switch will encapsulate the VLAN packet into a new VxLAN packet with VxLAN destination MAC/IP address set to the selected CFS switch MAC/IP address and VxLAN source MAC/IP address set to its own MAC/IP address and then send the new VxLAN packet to the selected CFS port in step 1426.

Figure 14B:
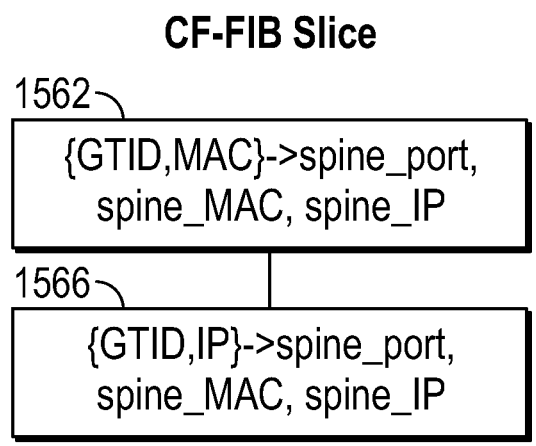
FIG. 14B shows the mapping of CF-FIB table slice in the CFS switch.
Figure 14C:
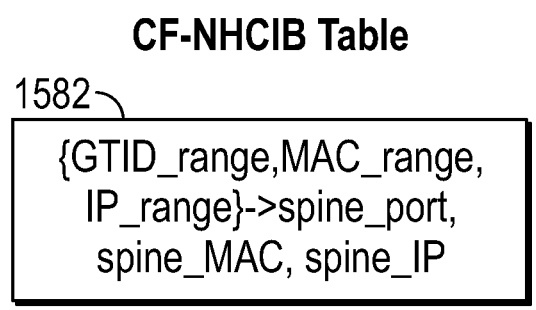
FIG. 14C shows the mapping of CF-NHCIB in the CFS switch.

FIG. 14A describes the process steps 1500 performed by the packet forwarder 1148. In step 1502 the CFS switch receives a VxLAN packet from one of its spine ports, the receiving CFS switch spine port interface 1142 transfers the packet to the packet forwarder, which in step 1506 extracts the VxLAN VNID to GTID, and un-encapsulates the VxLAN packet, which provides the VLAN packet and associated MAC destination address (or IP destination address) which is provided by the packet forwarder to the CF-FIB table slice 1146, which uses the GTID in combination with either the MAC destination address (of table 1562 in FIG. 15B) or IP destination address (of table 1566 in FIG. 15B) to check for a matching entry in step 1512. In step 1516 if a matching CF-FIB table slice entry can be found, packet forwarder in step 1532 will extract the associated (CFS switch) spine port and spine switch MAC address and IP address, which are used in step 1536 to modify the layer-3 VLAN packet MAC addresses and in step 1552 form the respective destination addresses of a new VxLAN packet which is sent to the selected spine_port in step 1556. On the other hand, if no matching CF-FIB table slice entry can be found, packet forwarder will check CF-NHCIB (of table 1582 in FIG. 14C) for a matching entry in step 1522. In step 1524 if a matching CF-NHCIB entry can be found, proceed to process the packet just as in steps 1532, 1536, 1552 and 1556, otherwise, drop the packet in step 1526.

When the spine switch receives a VxLAN packet from one of its CFS ports of interface 1134 transfers the packet to the packet forwarder 1137, which extracts the GTID from VxLAN VNID in step 1402 before continuing with the spine switch packet process of step 406 in FIG. 4A. In addition, if no matching GFIB slice entry can be found for the packet received from a CFS port, the spine switch will drop the packet in step 1410.

Figure 15B:
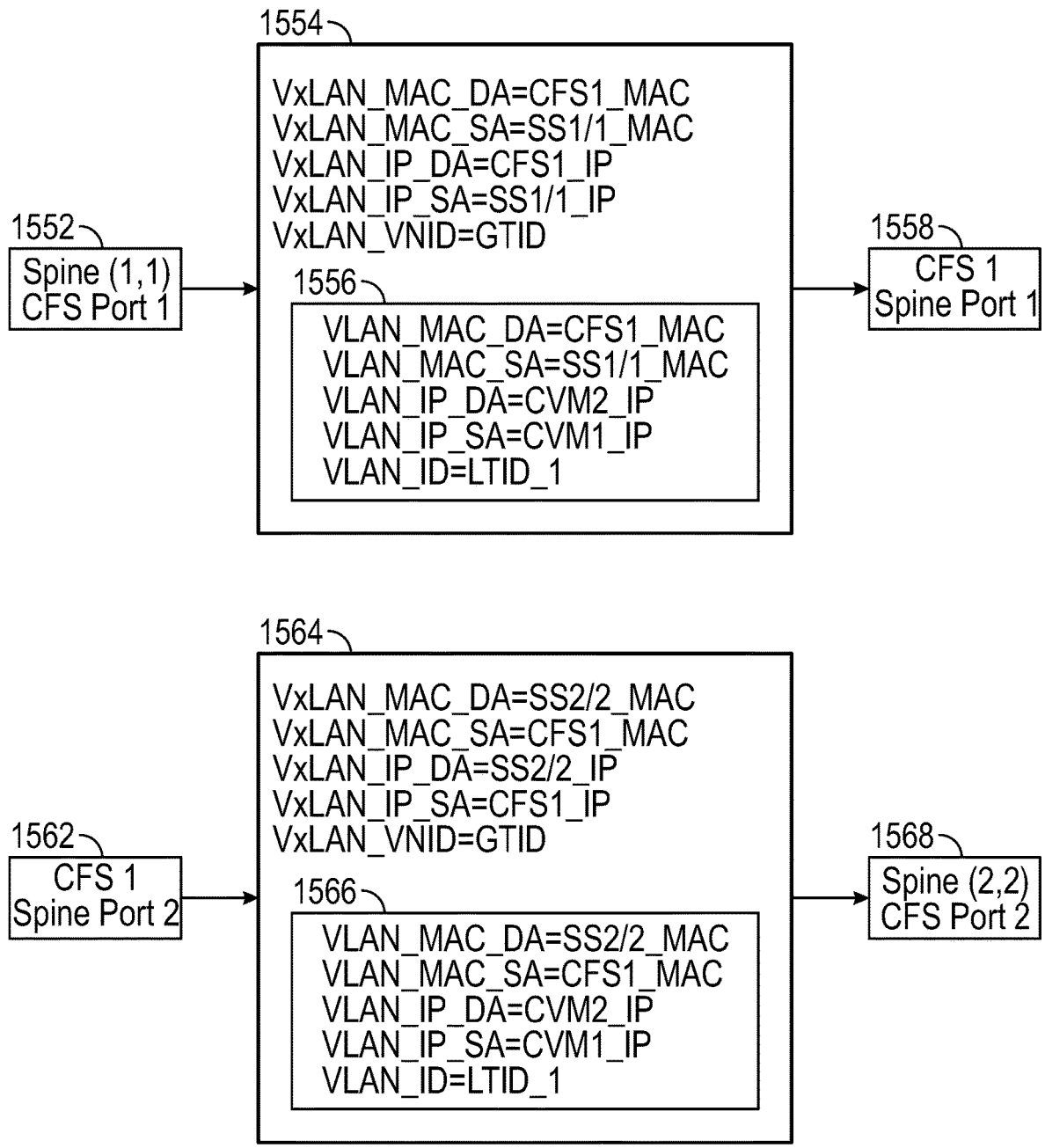
FIG. 15B shows layer 3 packet field modifications when packet moving between spine switches in two different switch fabrics through a CFS switch.

FIGS. 15A and 15B shows an example of packet processing for a layer 2 or layer 3 packet, respectively, from virtual machine CVM1 in switch fabric 1 to virtual machine CVM2 in switch fabric 2, requiring a path through one of the cross fabric spine switches 1140. As described previously, each CVM may have its own unique MAC address and IP address, which is completely independent from the MAC and IP address of the physical server which hosts the CVM process.

FIG. 15A shows CFS port 1 of spine switch 1 in switch fabric 1 1502 which sends the VxLAN packet 1504 shown with MAC destination address (VxLAN_MAC_DA) and IP destination address (VxLAN_IP_DA) set to the MAC address and IP address of CFS switch 1 and MAC source address (VxLAN_MAC_SA) and IP source address (VxLAN_IP_SA) set to the MAC address and IP address of spine switch 1 in switch fabric 1, and the VxLAN_VNID set to a global tenant ID value (GTID) includes an inner VLAN packet 1506 shown with MAC destination address (VxLAN_MAC_DA) set to the MAC address of CVM1, MAC source address (VxLAN_MAC_SA) set to the MAC address of CVM2 and VLAN_ID stays as the CVM1 local tenant ID value (LTID_1). The packet forwarder 1148 of CFS switch 1 receives a VxLAN packet from its spine port 1 1508 forms a new VxLAN packet and sends the new VxLAN packet on its spine port 2 1512 to the CFS port 2 of spine switch 2 in switch fabric 2 1518, the new VxLAN packet 1514 shown with MAC destination address (VxLAN_MAC_DA) and IP destination address (VxLAN_IP_DA) set to the MAC address and IP address of spine switch 2 in switch fabric 2 and MAC source address (VxLAN_MAC_SA) and IP source address (VxLAN_IP_SA) set to the MAC address and IP address of CFS switch 1, and the VxLAN_VNID stays the same containing an inner VLAN packet 1516 same as 1506.

FIG. 15B shows the analogous processing where the data center network is operating on layer 3 IP addresses. In this example the modification process on the VxLAN packet header is identical to the one shown in FIG. 15A but with different modification process for the inner VLAN packet header as shown, spine switch 1 in switch fabric 1 modifies the inner VLAN packet 1556 shown with MAC destination address (VLAN_MAC_DA) set to the MAC address of CFS switch 1, MAC source address (VLAN_MAC_SA) set to the MAC address of spine switch 1 in switch fabric 1, the IP destination address (VLAN_IP_DA) set to the IP address of CVM1, IP source address (VLAN_IP_SA) set to the IP address of CVM2 and VLAN_ID stays as the CVM1 local tenant ID value (LTID_1), CFS switch 1 modifies the inner VLAN packet 1566 shown with MAC destination address (VLAN_MAC_DA) set to the MAC address of spine switch 2 in switch fabric 2, MAC source address (VLAN_MAC_SA) set to the MAC address of CFS switch 1 and the rest of inner VLAN packet header stays the same as in 1556.

I claim:

1. A Cross Fabric Spine (CFS) switch for a data center network, the CFS switch having a CFS switch MAC address, the CFS switch comprising:

a plurality of spine ports for receiving and transmitting VxLAN packets;

a Cross Fabric Forwarding Information Base (CF-FIB) table slice containing a plurality of CF-FIB entries, at least one CF-FIB entry providing an association between a Global Tenant IDentifier (GTID) and a Virtual Local Area Network (VLAN) packet MAC destination address or IP destination address to a particular spine port of said plurality of spine ports, the at least one entry of the CF-FIB table slice also containing an association between the GTID and a spine switch MAC address and also a spine switch IP address;

a Cross Fabric Next Hop Capability Information Base (CF-NHCIB) table containing a plurality of CF-NHCIB entries, at least one CF-NHCIB entry providing an association between a range of GTIDs and a VLAN packet MAC destination address range or VLAN packet destination IP address range to a particular spine port of the plurality of spine ports, the at least one CF-NHCIB entry also providing an association to a spine switch MAC address and a spine switch IP address;

a CFS switch packet forwarder coupled to the CF-NHCIB table, the CF-FIB table slice, and to the plurality of spine ports;

the CFS switch packet forwarder, upon receipt of a VxLAN packet having a global tenant identifier (GTID) value and an encapsulated VLAN packet having at least one of a layer 2 packet with a Media Access Controller (MAC) destination address or a layer 3 packet with an Internet Protocol (IP) destination address:

un-encapsulating the VLAN packet from the VxLAN packet and extracting the MAC destination address or the IP destination address;

from the GTID of the VxLAN packet, identifying the particular spine port, a spine switch MAC address and IP address from the CF-NHCIB or the CF-FIB table slice associated with the GTID and extracted MAC destination address or extracted IP destination address;

when the VLAN packet is a layer 3 VLAN packet, modifying the layer 3 VLAN packet by setting the MAC destination address to the spine switch MAC address and the MAC source address to the CFS switch MAC address;

re-encapsulating the VLAN packet into a new VxLAN packet and setting the VLAN packet destination address to an associated spine switch MAC address and IP address from the CF-NHCIB table or the CF-FIB table slice;

forwarding the new VxLAN packet to the particular spine port.

2. The CFS switch of claim 1 where, when a matching CF-FIB entry for a GTID of the VxLAN packet exists and a particular spine port and a spine switch is identified from the CF-FIB table slice, the CFS switch packet forwarder configured to create a new VxLAN packet containing a modified VLAN packet from the VLAN packet, the modified VLAN packet comprising the VLAN packet with a header changed to a spine switch MAC destination address associated with the GTID from the CF-FIB table slice for a layer 3 VLAN packet, the new VxLAN packet having a header containing the GTID, the particular spine switch MAC and IP address, and encapsulated modified VLAN packet, the CFS switch packet forwarder thereafter forwarding the encapsulated packet to the particular spine port.

3. The CFS switch of claim 1 where, if the CF-FIB table entries do not match the GTID but an entry of the CF-NHCIB table matching a VLAN packet destination address exists identifying a particular spine port and a spine switch MAC destination address, the packet forwarding engine creates a new VxLAN packet encapsulating the VLAN packet, and when the VLAN packet is a layer 3 VLAN packet, the VLAN packet is modified to use a spine switch MAC address associated with the GTID of the entry of the CF-NHCIB table, the new VxLAN packet having a header containing the GTID and at least one of: the spine switch MAC address or the spine switch IP address associated with the GTID, the CFS switch packet forwarder configured to forward the new VxLAN packet to the particular spine port.

4. The CFS switch of claim 1 where, when the VLAN packet is a layer 2 packet, a VLAN packet MAC destination address used to search the CF-NHCIB table or the CF-FIB table slice is the VLAN MAC destination address, and when the VLAN packet is a layer 3 packet, a VLAN destination IP address used to search the CF-NHCIB table or the CF-FIB table slice is the VLAN destination IP address.

5. The CFS switch of claim 1 where, when the packet forwarding engine receives an encapsulated VLAN packet from a spine port, a GTID field is recovered from a header of the encapsulated VLAN packet, and at least one of a MAC destination address or an IP destination address is recovered from the VLAN packet.

6. The CFS switch of claim 1 where the encapsulated VLAN packet has a destination address which is at least one of a VLAN MAC destination address or a VLAN destination IP address.

7. The CFS switch of claim 1 where the CFS switch spine ports comprise electrical transceivers configured to receive and transmit electrical signals or optical transceivers configured to receive and transmit optical signals.

8. A Container Virtual Machine (CVM) network comprising:

a plurality of Cross Fabric Spine (CFS) Switches, each CFS switch comprising:

a plurality of spine ports coupled to a packet forwarder, at least one spine port coupled to a plurality of spine switches;

a Cross Fabric Forwarding Information Base (CF-FIB) table slice coupled to the packet forwarder, the CF-FIB table slice containing a plurality of entries, each entry associating a Global Tenant IDentifier (GTID) value and a Virtual Local Area Network (VLAN) destination address to an identified spine port address;

a Cross Fabric Next Hop Capability Information Base (CF-NHCIB) table coupled to the packet forwarder, the CF-NHCIB table containing a plurality of entries, each entry associating a range of GTIDs and a VLAN packet destination address range to a particular identified spine port address;

the packet forwarder configured to:
receive a VxLAN packet from a spine port of the plurality of spine ports;
recover a GTID and unencapsulate a VLAN packet containing a destination address from the VxLAN packet;
find an entry of the CF-NHCIB table or an entry of the CF-FIB table slice identifying a particular spine port and spine switch MAC address and spine switch IP address;
modify the VLAN packet by changing the VLAN packet destination address to a destination address associated with the GTID and VLAN destination address from the CF-NHCIB table or the CF-FIB table;
form a new VxLAN packet containing the GTID and encapsulated modified VLAN packet;
transmit the new VxLAN packet to the particular spine port.

9. The CVM network of claim 8 where the plurality of CVMs comprises a plurality of switch fabrics, each switch fabric comprising a plurality of spine switches, each spine switch coupled to a plurality of leaf switches, each leaf switch coupled to a plurality of servers, each server hosting a plurality of Container Virtual Machines (CVM).

10. The CVM network of claim 8 where the VLAN packet destination address range of the CF-NHCIB comprises at least one of a VLAN layer 2 MAC address or a VLAN layer 3 IP address.

11. The CVM network of claim 8 where, when the VLAN packet is a layer 3 VLAN packet, the packet forwarder is configured to modify the layer 3 VLAN packet by setting a VLAN packet MAC destination address to the spine switch MAC address and the VLAN MAC source address to the CFS switch MAC address.

12. The CVM network of claim 8 where modifying the VLAN packet by changing the VLAN packet destination address to a destination address associated with the GTID and VLAN destination address comprises finding a matching entry in the CF-FIB table slice for the GTID and VLAN layer 2 destination address or GTID and VLAN layer 3 destination address, the matching entry containing the identified spine port, and a spine switch MAC address and spine switch IP address used in a header of the new VxLAN packet.

13. The CVM network of claim 8 where modifying the VLAN packet by changing the VLAN packet destination address to a destination address associated with the GTID and VLAN destination address comprises finding a matching entry on the CF-NHCIB table for the GTID and VLAN layer 2 destination address or VLAN layer 3 destination address, the matching entry containing the identified spine port, and a spine switch MAC address and spine switch IP address used in a header of the new VxLAN packet.

14. A process operative on a plurality of leaf switches, each leaf switch having an uplink port coupled to at least one associated spine switch, each spine switch coupled to at least one Cross Fabric Spine (CFS) switch, each leaf switch having a Local Forward Information Base (LFIB) table and also having configuration information and capability information, each CFS switch having a Cross Fabric Forward Information Base (CF-FIB) table slice containing entries and a Cross Fabric Next Hop Capability Information Base (CF-NHCIB) table containing entries, the process comprising:
an initialization process comprising:
each leaf switch establishing a reliable message connection through the at least one associated spine switch to each associated CFS switch;
each leaf switch transmitting associated configuration and capability information through the at least one associated spine switch to each associated CFS switch using the reliable message connection;
each CFS switch populating its associated CF-NHCIB table from the configuration and capability information received from the spine switches and leaf switches;
each CFS switch populating its associated CF-FIB slice table based on the information in the reliable message connection received from the spine switches and leaf switches;
a CVM change request process comprising:
receipt of a CVM move request identifying a new leaf switch and an old leaf switch, the CVM move request also containing a GFIB table slice entry and an LFIB entry;
adding the LFIB entry to the new leaf switch and adding the GFIB table slice entry to a new spine switch;
adding or updating the CF-FIB table slice for a new CFS switch;
deleting the moved CVM entry from the LFIB of the old leaf switch and deleting an entry for a corresponding GFIB slice of a spine switch in the old switch fabric.

15. The process of claim 14 where the new CF-NHCIB table slice entry contains a range of CVM GTID values, a range of CVM MAC addresses, and a range of CVM MAC addresses corresponding to an address range capability of an associated spine switch.

16. The process of claim 14 where at least one entry in the CFS switch CF-FIB table slice contains a reference to at least one CVM that has been moved to a different switch fabric.

17. The process of claim 14 where the CVM change request comprises an ADD-CVM message containing a mapping between a moved CVM attribute and an entry in an associated CFS switch CF-FIB slice.

18. The process of claim 14 where the CVM change request comprises a DEL-CVM message identifying an entry of a particular CFS switch and CF-FIB table slice entry, including a mapping between a moved CVM and an entry in the CFS switch CF-NHCIB table slice.

* * * * *